United States Patent
Shimai et al.

(10) Patent No.: US 10,713,553 B2
(45) Date of Patent: Jul. 14, 2020

(54) IC TAG, IC TAG CONTAINER, AND RUBBER PRODUCT WITH IC TAG

(71) Applicant: NITTA CORPORATION, Osaka-shi, Osaka (JP)

(72) Inventors: Toshiharu Shimai, Yamatokooriyama (JP); Yoshiharu Kiyohara, Yamatokooriyama (JP)

(73) Assignee: NITTA CORPORATION, Osaka (JP)

( * ) Notice: Subject to any disclaimer, the term of this patent is extended or adjusted under 35 U.S.C. 154(b) by 12 days.

(21) Appl. No.: 15/779,697

(22) PCT Filed: Sep. 8, 2016

(86) PCT No.: PCT/JP2016/076413
§ 371 (c)(1),
(2) Date: May 29, 2018

(87) PCT Pub. No.: WO2017/094309
PCT Pub. Date: Jun. 8, 2017

(65) Prior Publication Data
US 2019/0286964 A1  Sep. 19, 2019

(30) Foreign Application Priority Data

Nov. 30, 2015 (JP) ................ 2015-234104

(51) Int. Cl.
*G06K 19/077* (2006.01)
*G06K 19/07* (2006.01)

(52) U.S. Cl.
CPC ....... *G06K 19/07758* (2013.01); *G06K 19/07* (2013.01); *G06K 19/077* (2013.01); *G06K 19/07728* (2013.01); *G06K 19/07773* (2013.01)

(58) Field of Classification Search
CPC ................................. G06K 19/07758
(Continued)

(56) References Cited

U.S. PATENT DOCUMENTS 5,013,900 A    5/1991  Hoppe
2008/0036609 A1  2/2008  Baba et al.
(Continued)

FOREIGN PATENT DOCUMENTS

| JP | 2005-11227 A | 1/2005 |
| JP | 2008-159007 A | 7/2008 |
| JP | 2013-222411 A | 10/2013 |
| WO | WO 2009/011041 A1 | 1/2009 |

OTHER PUBLICATIONS

International Search Report, issued in PCT/JP2016/076413, PCT/ISA/210, dated Oct. 18, 2016.
(Continued)

*Primary Examiner* — Toan C Ly
(74) *Attorney, Agent, or Firm* — Birch, Stewart, Kolasch & Birch, LLP

(57) ABSTRACT

Provided is a technique for preventing the occurrence of damage, such as breaking of an antenna, due to bending, in an IC tag in which an IC chip is protected with a reinforcing member. An IC tag according to an aspect of the present invention is an IC tag attachable to an article, and includes an inlay including an IC chip and an antenna electrically connected to the IC chip; at least one reinforcing member that is disposed on at least one face of the inlay so as to protect the IC chip; and at least one sheet-like cover member that is disposed on at least one face side of the inlay and that covers the reinforcing member. The cover member is not adhesively joined in a region around the reinforcing member and is adhesively joined to at least one of the inlay and the reinforcing member in another region.

15 Claims, 17 Drawing Sheets

(58) Field of Classification Search
USPC .......................................................... 235/492
See application file for complete search history.

(56) References Cited

U.S. PATENT DOCUMENTS

| | | | |
|---|---|---|---|
| 2009/0207027 A1* | 8/2009 | Banerjee | G06K 19/07749 340/572.7 |
| 2010/0097191 A1 | 4/2010 | Yamagajo et al. | |
| 2013/0277433 A1 | 10/2013 | Baba et al. | |
| 2013/0277435 A1* | 10/2013 | Bielmann | G06K 19/07749 235/492 |
| 2014/0103117 A1* | 4/2014 | Takeuchi | G06K 19/07754 235/492 |
| 2015/0014418 A1 | 1/2015 | Ponikwar et al. | |
| 2015/0278674 A1 | 10/2015 | Schoengrundner et al. | |
| 2016/0101019 A1* | 4/2016 | McDowell | G06K 19/0776 206/459.5 |

OTHER PUBLICATIONS

Written Opinion of the International Searching Authority, issued in PCT/JP2016/076413, PCT/ISA/237, dated Oct. 18, 2016.
Partial European Search Report, dated Jun. 13, 2019, for European Application No. 16870249.6.
Taiwanese Office Action and Search Report for Taiwanese Application No. 105135879, dated Apr. 16, 2020, with partial English translation.

* cited by examiner

IC TAG, IC TAG CONTAINER, AND RUBBER PRODUCT WITH IC TAG

TECHNICAL FIELD

The present invention relates to a technique for an IC tag, an IC tag container, and a rubber product with an IC tag.

BACKGROUND ART

Recently, IC tags called "inlays" in which an antenna pattern for radio frequency communication and an IC chip are mounted on a base sheet made of plastic, paper, or the like are used in various fields. For example, such inlays are sealed with resin and then attached to or embedded in articles, whereby the inlays are used for management of the articles.

However, since IC chips are hard to bend compared with antenna patterns, which are easy to bend, if an inlay is bent, bending stress may be applied to the IC chip, which may result in breakage of the IC chip or detachment of the IC chip from the antenna pattern. To address this problem, Patent Literature 1 proposes an IC tag in which, in order to reduce bending stress that may act on the IC chip, a hard reinforcing member that is larger than the IC chip is disposed on the IC chip.

CITATION LIST

Patent Literature

Patent Literature 1: WO 2009/011041

SUMMARY OF INVENTION

Technical Problem

Incidentally, IC tags such as those described above are employed for a variety of uses. For example, an IC tag such as those described above maybe used attached to a product that is likely to be subjected to repetitive bending, such as a belt, a hose, a tube, a mat, or a garment. Moreover, to fix an IC tag such as those described above to a product, the IC tag may be fixed after pressure is applied thereto.

In such cases, in an IC tag such as the one disclosed in Patent Literature 1, since the IC chip is covered and protected with a hard reinforcing member, breakage or detachment of the IC chip due to bending can be prevented. However, the inventors of the present invention found the following problem with an IC tag such as the one disclosed in Patent Literature 1.

That is to say, in an IC tag such as the one disclosed in Patent Literature 1, there is a significant difference in flexibility between a portion where the hard reinforcing member is present and a portion where the hard reinforcing member is absent. For this reason, when the IC tag including the antenna is bent, stress may concentrate in an outer peripheral edge of the reinforcing member, thereby causing the antenna to break. The inventors of the present invention found this problem.

An aspect of the present invention has been made in view of the above-described issue, and it is an object thereof to provide a technique for preventing damage, such breaking of an antenna, due to bending from occurring in an IC tag in which an IC chip is protected with a reinforcing member.

Solution to Problem

In order to address the above-described problem, the present invention adopts the following configurations.

That is to say, an IC tag according to an aspect of the present invention is an IC tag attachable to an article, the IC tag including an inlay including an IC chip and an antenna electrically connected to the IC chip; at least one reinforcing member that is disposed on at least one face of the inlay so as to protect the IC chip; and at least one sheet-like cover member that is disposed on at least one face side of the inlay and that covers the reinforcing member, wherein the cover member is not adhesively joined in a region around the reinforcing member and is adhesively joined to at least one of the inlay and the reinforcing member in another region.

The IC tag according to the above-described configuration includes the cover member that covers the reinforcing member, and the cover member is not adhesively joined in the region around the reinforcing member and is adhesively joined to at least one of the inlay and the reinforcing member in the other region. That is to say, with the above-described configuration, the cover member is not adhesively joined to the inlay around the reinforcing member, and therefore, even when the cover member comes into intimate contact with the inlay, a gap is formed at an outer peripheral edge of the reinforcing member.

For this reason, even when the IC tag bends under an external force, concentration of stress in the outer peripheral edge of the reinforcing member can be alleviated due to the effect of the gap, and thus, the occurrence of damage, such as breaking of the antenna, can be prevented. Therefore, with the above-described configuration, in an IC tag in which an IC chip is protected with a reinforcing member, the occurrence of damage, such as breaking of an antenna, due to bending can be prevented. It should be noted that the position of the at least one reinforcing member may be selected as appropriate in accordance with the embodiment. For example, the at least one reinforcing member may cover the IC chip or may be disposed in the vicinity of the periphery of the IC chip, thereby protecting the IC chip.

Moreover, as another form of the IC tag according to the above-described aspect, in the above-described IC tag, the reinforcing member may be disposed so as to cover the IC chip, in order to protect the IC chip. With this configuration, an external force exerted on the IC chip can be directly cut off by the reinforcing member, and therefore, the IC chip can be sufficiently protected.

Moreover, as another form of the IC tag according to the above-described aspect, the above-described IC tag may include the at least one reinforcing member that comprises two reinforcing members and the at least one cover member that comprises two cover members. In addition, respective both faces of the IC chip may be covered with the respective reinforcing members, and the respective reinforcing members may be covered with the respective cover members. With this configuration, both faces of the inlay are protected by the two reinforcing members and the two cover members. For this reason, the durability of the IC tag can be increased.

Moreover, as another form of the IC tag according to the above-described aspect, in the above-described IC tag, each cover member may be formed of a waterproof material and may be formed to be larger than external shapes of the inlay and the reinforcing members in a plan view. In addition, both cover members may be sealed together in a region surrounding the inlay and the reinforcing members so as to form an internal space that contains the inlay and the reinforcing members. With this configuration, the two waterproof cover members are sealed together in the surrounding region, thereby forming a hermetically sealed internal space, and the inlay and the reinforcing members are contained in the thus formed internal space. For this reason, with this configuration, the inlay can be prevented from coming into contact with water. That is to say, a waterproof IC tag can be configured.

Moreover, as another form of the IC tag according to the above-described aspect, the above-described IC tag may include the at least one reinforcing member that comprises four reinforcing members and the at least one cover member that comprises four cover members. In addition, two of the reinforcing members and two of the cover members may be alternatingly arranged on each of both faces of the IC chip. With this configuration, a highly durable IC tag can be provided by using the four reinforcing members and the four cover members.

Moreover, as another form of the IC tag according to the above-described aspect, in the above-described IC tag, the cover member may be formed of a pliable sheet-like resin material. With this configuration, the flexibility and the durability of the IC tag can be secured.

Moreover, an IC tag container according to an aspect of the present invention includes the IC tag according to any one of the above-described forms; and an enclosing member that is disposed on at least one face side of the inlay and that covers the inlay, the reinforcing member, and the cover member. With this configuration, for the same reasons as described above, in an IC tag which is contained in an IC tag container and in which an IC chip is protected with a reinforcing member, the occurrence of damage, such as breaking of an antenna, due to bending can be prevented.

Moreover, as another form of the IC tag container according to the above-described aspect, in the above-described IC tag container, the enclosing member may be formed into a bag-like shape that contains the inlay, the reinforcing member, and the cover member. With this configuration, damage to the IC tag can be prevented due to the IC tag being contained in the enclosing member formed in the bag-like shape. That is to say, the durability of the IC tag can be increased.

Moreover, as another form of the IC tag container according to the above-described aspect, in the above-described IC tag container, the enclosing member may be formed of a waterproof material. With this configuration, the IC tag can be prevented from coming into contact with water, due to the IC tag being contained in the enclosing member formed of the waterproof material in the bag-like shape. Therefore, with this configuration, a waterproof IC tag container can be configured.

Moreover, as another form of the IC tag container according to the above-described aspect, in the above-described IC tag container, the enclosing member may be formed of a fabric impregnated with rubber. With this configuration, an IC tag container that is easy to attach to a rubber product can be provided.

Moreover, as another form of the IC tag container according to the above-described aspect, in the above-described IC tag container, the rubber may be unvulcanized. With this configuration, the rubber with which the fabric is impregnated can be vulcanized during integral molding of the IC tag container with a rubber product, and thus the enclosing member and the rubber product can be adhesively joined to each other with high adhesion. As a result, water is unlikely to reach the IC tag, and thus a rubber product with an IC tag with excellent water resistance can be obtained. That is to say, with this configuration, an IC tag container that enables a rubber product with an IC tag with excellent water resistance to be obtained can be provided.

Moreover, a rubber product with an IC tag according to an aspect of the present invention includes the IC tag container according to any one of the above-described forms; and an attachment target member that is at least partially formed of a rubber material and that is adhesively joined to the enclosing member of the IC tag container. With this configuration, for the same reasons as described above, in an IC tag which is attached to a rubber product and in which an IC chip is protected with a reinforcing member, the occurrence of damage, such as breaking of an antenna, due to bending can be prevented.

Moreover, as another form of the rubber product with an IC tag according to the above-described aspect, in the above-described rubber product with an IC tag, the enclosing member of the IC tag container may be formed into a sheet-like shape, the inlay, the reinforcing member, and the cover member may be disposed between the enclosing member and the attachment target member, and a peripheral edge of the enclosing member may be adhesively joined to the rubber material of the attachment target member. With this configuration, an internal space is formed between the enclosing member and the attachment target member by adhesively joining the peripheral edge of the enclosing member to the rubber material of the attachment target member, and the IC tag is contained in the thus formed internal space. For this reason, with this configuration, the durability and the water resistance of the IC tag can be increased.

Moreover, an IC tag according to an aspect of the present invention is an IC tag attachable to an article, the IC tag including an inlay including an IC chip and an antenna electrically connected to the IC chip; at least one reinforcing member that is disposed on at least one face of the inlay so as to protect the IC chip; and at least one sheet-like cover member that is disposed on at least one face side of the inlay and that covers the reinforcing member, wherein the cover member is adhesively joined to at least one of the inlay and the reinforcing member, and a gap between the cover member and the inlay around the reinforcing member is filled with a filling member that is softer than the cover member.

The IC tag according to the above-described configuration includes the cover member that covers the reinforcing member, and the cover member is adhesively joined to at least one of the inlay and the reinforcing member. Also, the gap between the cover member and the inlay around the reinforcing member is filled with the filling member, which is softer than the cover member. That is to say, with the above-described configuration, even when the cover member comes into intimate contact with the inlay, the filling member that is softer than the cover member is disposed at an outer peripheral edge of the reinforcing member.

For this reason, even when the IC tag bends under an external force, concentration of stress in the outer peripheral edge of the reinforcing member can be alleviated due to the effect of the flexible filling member, and thus, the occurrence of damage, such as breaking of the antenna, can be prevented. Therefore, with the above-described configuration, in an IC tag in which an IC chip is protected with a reinforcing member, the occurrence of damage, such as breaking of an antenna, due to bending can be prevented.

That is to say, the IC tag according to the present form is configured to prevent damage caused by the above-described reasons, by substituting the filling member for the gap (air) formed in the IC tags according to the above-described forms. In other words, in the IC tags according to the above-described forms, concentration of stress in the outer peripheral edge of the reinforcing member is alleviated by filling the gap at the outer peripheral edge of the reinforcing member with air, which is softer than the cover member, and thus, the occurrence of damage, such as breaking of an antenna, is prevented. It should be noted that the features of the IC tags according to the above-described forms may also be applied to the IC tag according to the present form. Moreover, the position of the at least one reinforcing member may be selected as appropriate in accordance with the embodiment. For example, the at least one reinforcing member may cover the IC chip or may be disposed in the vicinity of the periphery of the IC chip, thereby protecting the IC chip.

Moreover, as another form of the IC tag according to the above-described aspect, in the above-described IC tag, the filling member may be foam or a pressure-sensitive adhesive. With this configuration, the occurrence of damage, such as breaking of the antenna, caused as a result of the above-described reasons can be prevented by a simple configuration using foam or a pressure-sensitive adhesive.

Moreover, an IC tag according to an aspect of the present invention is an IC tag attachable to an article, the IC tag including an inlay including an IC chip and an antenna electrically connected to the IC chip; at least one reinforcing member that is disposed on at least one face of the inlay so as to protect the IC chip; and at least one sheet-like cover member that is disposed on at least one face side of the inlay and that covers the reinforcing member, wherein the cover member is flexible so as to have a JIS-A hardness of 90 degrees or less, and is adhesively joined to at least one of the inlay and the reinforcing member.

The IC tag according to the above-described configuration includes the cover member that covers the reinforcing member, and the cover member is adhesively joined to at least one of the inlay and the reinforcing member. Also, the cover member is formed of a flexible material. For this reason, even when the IC tag bends under an external force, concentration of stress in an outer peripheral edge of the reinforcing member can be alleviated due to the effect of the flexible cover member, and thus, the occurrence of damage, such as breaking of the antenna, can be prevented. Therefore, with the above-described configuration, in an IC tag in which an IC chip is protected with a reinforcing member, the occurrence of damage, such as breaking of an antenna, due to bending can be prevented. It should be noted that the position of the at least one reinforcing member may be selected as appropriate in accordance with the embodiment. For example, the at least one reinforcing member may cover the IC chip or may be disposed in the vicinity of the periphery of the IC chip, thereby protecting this IC chip.

Advantageous Effects of Invention

According to the present invention, in an IC tag in which an IC chip is protected with a reinforcing member, the occurrence of damage, such as breaking of an antenna, due to bending can be prevented.

DESCRIPTION OF EMBODIMENTS

Figure 1:
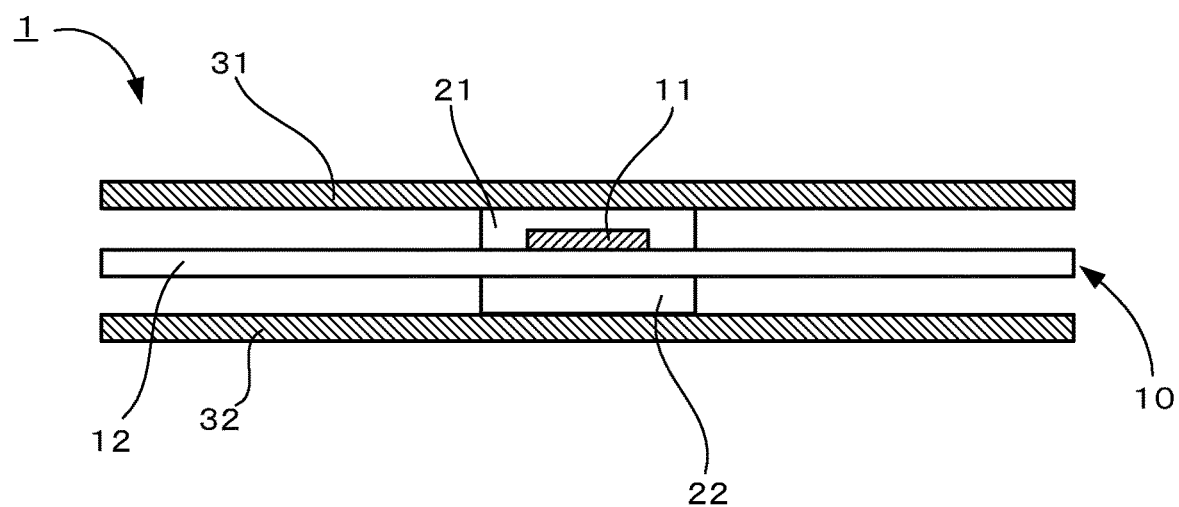
FIG. 1 is cross-sectional view diagrammatically illustrating an IC tag according to an embodiment.

Hereinafter, an embodiment according to an aspect of the present invention (hereinafter also referred to as "the present embodiment") will be described based on the drawings. However, the present embodiment described below should be construed in all respects as an exemplary illustration of the present invention. Various improvements and modifications may be made without departing from the scope of the present invention. That is to say, in carrying out the present invention, a specific configuration may be adopted as appropriate, in accordance with the embodiment. It should be noted that in the following description, for convenience of description, the directions in the drawings are used as references.

§ 1 Configuration Example

IC Tag

First, a configuration example of an IC tag 1 according to the present embodiment will be described using FIG. 1. FIG. 1 is a cross-sectional view diagrammatically illustrating an example of the IC tag 1 according to the present embodiment. As illustrated in FIG. 1, the IC tag 1 according to the present embodiment includes an inlay 10 including an IC chip 11 and an antenna 12, a pair of reinforcing members (21 and 22) that are attached so as to cover the IC chip 11 of the inlay 10, and sheet-like cover members (31 and 32) that are disposed so as to cover the inlay 10 and the pair of reinforcing members (21 and 22). The IC tag 1 is thus configured to be attachable to an article. Hereinafter, these constituent elements will be described.

Inlay

Figure 2:
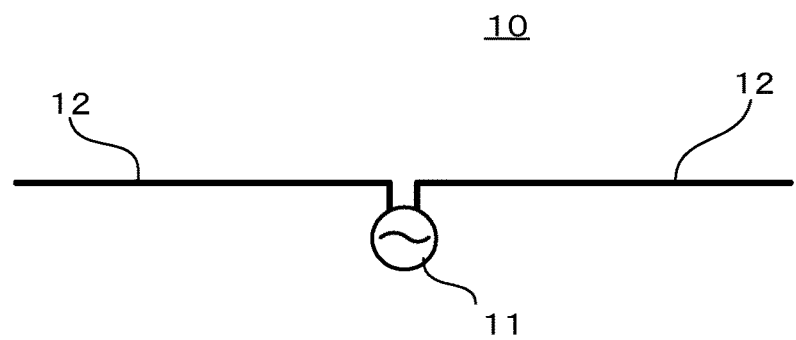
FIG. 2 is a plan view diagrammatically illustrating a schematic configuration of an inlay.
Figure 3:
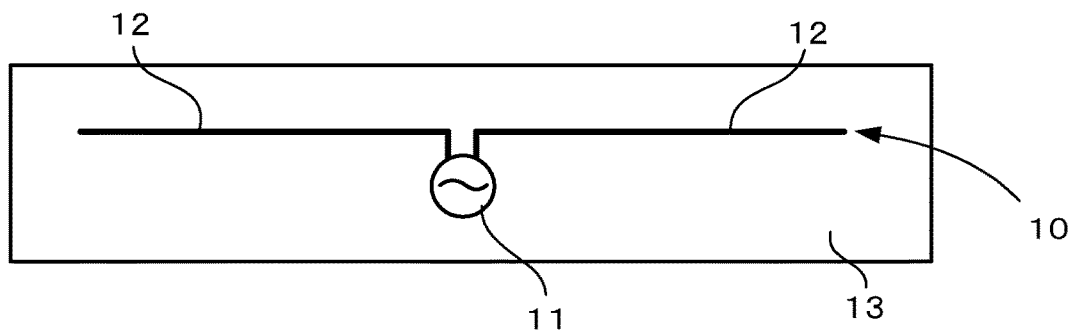
FIG. 3 is a plan view diagrammatically illustrating another example of the inlay.
Figure 4A:
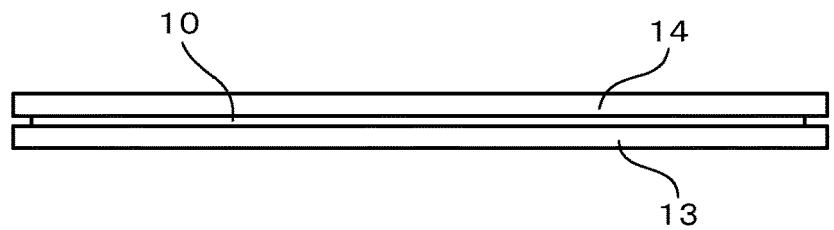
FIG. 4A is a cross-sectional view diagrammatically illustrating an example in which a protective sheet is provided on one face of the inlay.
Figure 4B:
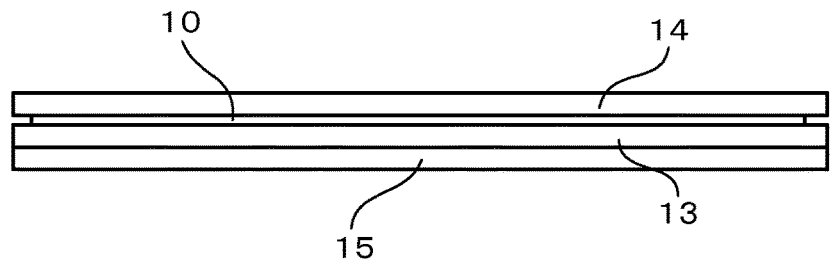
FIG. 4B is a cross-sectional view diagrammatically illustrating an example in which protective sheets are provided on both faces of the inlay.

First, the inlay 10 will be described further using FIGS. 2, 3, 4A, and 4B. FIG. 2 is a plan view diagrammatically illustrating a schematic configuration of the inlay 10 according to the present embodiment. FIG. 3 is a plan view diagrammatically illustrating another example of the inlay 10. Also, FIGS. 4A and 4B are cross-sectional views diagrammatically illustrating respective examples in which a protective sheet/protective sheets (14 and 15) is/are provided on one face/both faces of the inlay 10.

As illustrated in FIG. 2, the inlay 10 according to the present embodiment includes the IC chip 11 having a memory function and the antenna 12 formed of a conductive material, and the IC chip 11 and the antenna 12 are electrically connected to each other. The IC chip 11 is, for example, a known integrated circuit that retains data such as individual identification information for identifying commercial products. The antenna 12 has the shape of a known antenna such as a dipole antenna, for example, and receives electromagnetic waves from an external reading apparatus (hereinafter also referred to as "reader") and transmits electromagnetic waves to the reader. The IC chip 11 wirelessly transmits/receives data to/from the reader via the antenna 12 in a contactless manner.

It should be noted that in the case where a dipole antenna is adopted as the antenna 12, the inlay 10 can be formed into an elongated shape extending in a single direction as illustrated in FIG. 2. However, the type of the IC chip 11 and the type of the antenna 12 are not limited, and may be selected as appropriate in accordance with the embodiment. For example, the antenna 12 may have a meander line structure or a helical structure.

The inlay 10 may also include a sheet-like base material 13 as illustrated in FIG. 3. That is to say, the IC chip 11 and the antenna 12 may be disposed on one face of the sheet-like base material 13. However, the structure of the inlay 10 is not limited to this example, and the inlay 10 may be constituted by only the IC chip 11 and the antenna 12 as illustrated in FIG. 2. Moreover, the inlay 10 may have a structure in which, for example, the IC chip 11 and the antenna 12 are sandwiched between a pair of sheet-like base materials 13. This inlay 10 may be referred to as an "inlet".

Moreover, as illustrated in FIGS. 4A and 4B, a protective sheet for protecting the inlay 10 may be attached to one or both faces of the inlay 10. For example, as illustrated in FIG. 4A, a protective sheet 14 may be attached, with an adhesive, a pressure-sensitive adhesive, or the like, to a face of the inlay 10 on which the IC chip 11 and the antenna 12 are exposed. Alternatively, as illustrated in FIG. 4B, for example, the inlay 10 may be sandwiched between a pair of protective sheets (14 and 15) via a pressure-sensitive adhesive.

It should be noted that the material of the protective sheets (14 and 15) may be selected as appropriate, in accordance with the embodiment. For example, the protective sheets (14 and 15) may be formed of a sheet-like material made of polyethylene, polypropylene, polyethylene terephthalate, or the like. Moreover, in FIGS. 4A and 4B, the protective sheet/protective sheets (14 and 15) is/are attached to the inlay including the base material 13. However, the present invention is not limited to such examples, and configurations may also be adopted in which the protective sheet/protective sheets (14 and 15) is/are attached to the inlay 10 that does not include the base material 13.

The above-described inlay 10 can be produced in the following manner, for example. That is to say, in order to form the antenna 12, a conductive member such as aluminum or copper is applied onto the sheet-like base material 13 made of a resin material such as polyethylene, polypropylene, polyethylene terephthalate, polyimide, nylon, ethylene-vinyl acetate copolymer, polyvinyl chloride, or an elastomer, or a paper material. Then, the antenna 12 is shaped through etching, punching, or the like, and the IC chip 11 is disposed as appropriate. Thus, the inlay 10 can be produced. Alternatively, the antenna 12 may also be formed through vapor deposition of a metal film or printing such as screen printing.

The above-described inlay 10 transmits information stored in the IC chip 11 and receives information to the IC chip 11 using radio waves in the UHF band, for example. It should be noted that the size of the inlay 10 may be set as appropriate in accordance with the use of a rubber product or the like, which will be described later, and is not limited. Moreover, the inlay 10 may be provided with an impedance matching portion for matching the impedance between the IC chip 11 and the antenna 12.

Reinforcing Member

Figure 5A:
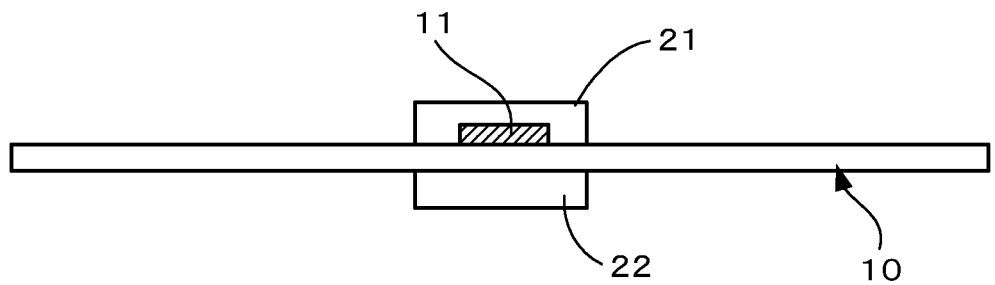
FIG. 5A is a cross-sectional view diagrammatically illustrating a state in which reinforcing members are attached to the inlay.
Figure 5B:
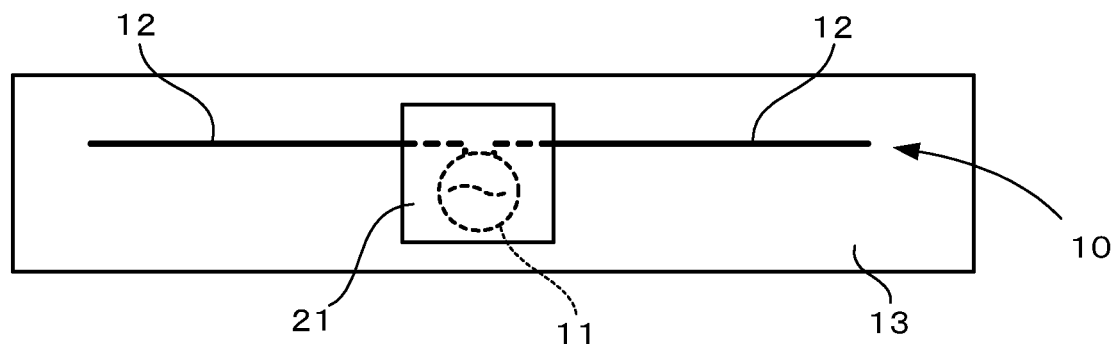
FIG. 5B is a plan view diagrammatically showing the state in which the reinforcing members are attached to the inlay.

Next, the reinforcing members (21 and 22) will be described further using FIGS. 5A and 5B. FIGS. 5A and 5B are a cross-sectional view and a plan view, respectively, diagrammatically illustrating a state in which the reinforcing members (21 and 22) are attached to the inlay 10. As illustrated in FIGS. 5A and 5B, the sheet-like reinforcing members (21 and 22) are fixed to upper and lower faces, respectively, of the inlay 10 via an adhesive or the like so as to cover the IC chip 11 when viewed in the up-down direction.

The reinforcing members (21 and 22) are provided for the purpose of protecting the IC chip 11. In the present embodiment, the reinforcing members (21 and 22) are each formed into a rectangular shape having a larger area than the IC chip 11 in plan view, as illustrated in FIG. 5B, and disposed so as to cover the IC chip 11 when viewed in the up-down direction. Thus, the reinforcing members (21 and 22) according to the present embodiment directly protect the IC chip 11. Moreover, the reinforcing members (21 and 22) are formed of a material that is hard or thick enough to prevent the IC chip 11 from bending even when, for example, the antenna 12 of the inlay 10 is bent.

Examples of such material include a hard sheet formed of polyethylene (PE) or a resin that is harder than PE. Examples of the resin that is harder than polyethylene include polyethylene terephthalate (PET), nylon, polycarbonate, an ABS resin, an AES resin, an epoxy resin, and polypropylene (PP).

Moreover, the thickness of each reinforcing member (21 or 22) may be selected as appropriate in accordance with the embodiment. For example, the thickness of each reinforcing member (21 or 22) may be set within a range of 100 μm to 1000 μm. As long as each reinforcing member (21 or 22) has a larger area than the IC chip 11, or in other words, is larger than the external shape of the IC chip 11, the reinforcing members (21 and 22) may have a shape other than a rectangular shape.

It should be noted that, according to the embodiment shown by FIG. 5A, the two reinforcing members (21 and 22) are respectively disposed on both faces of the inlay 10. However, the positions of the reinforcing members are not limited to this example, and either one of the reinforcing members (21 and 22) may be omitted. For example, a reinforcing member (reinforcing member 21) may be disposed on only one face of the inlay 10, in particular, a side (upper face side in FIG. 5A) of the inlay 10 on which the IC chip 11 is exposed.

Moreover, the positions of the reinforcing members (21 and 22) can be changed as appropriate in accordance with the configuration of the inlay 10. For example, in the case where the inlay 10 is provided with the above-described protective sheets (14 and 15), the reinforcing members (21 and 22) may be disposed on the respective protective sheets (14 and 15). In the case where both of the protective sheets (14 and 15) are not provided, the reinforcing members (21 and 22) may be disposed directly on the IC chip 11 or may be disposed on the base material 13 of the inlay 10.

Cover Member

Figure 6A:
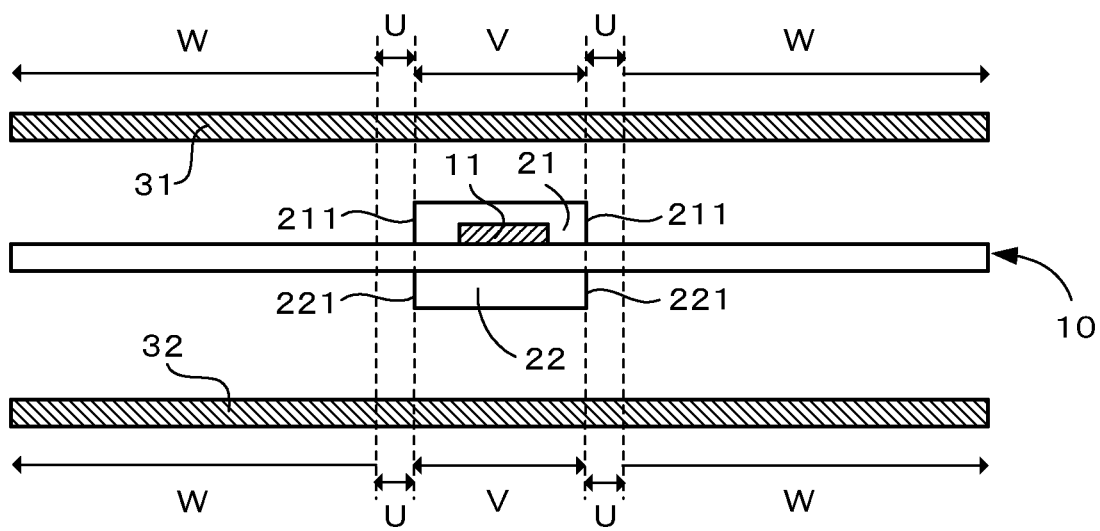
FIG. 6A is a cross-sectional view diagrammatically illustrating regions where cover members can be adhesively joined and regions where the cover members are not adhesively joined.
Figure 6B:
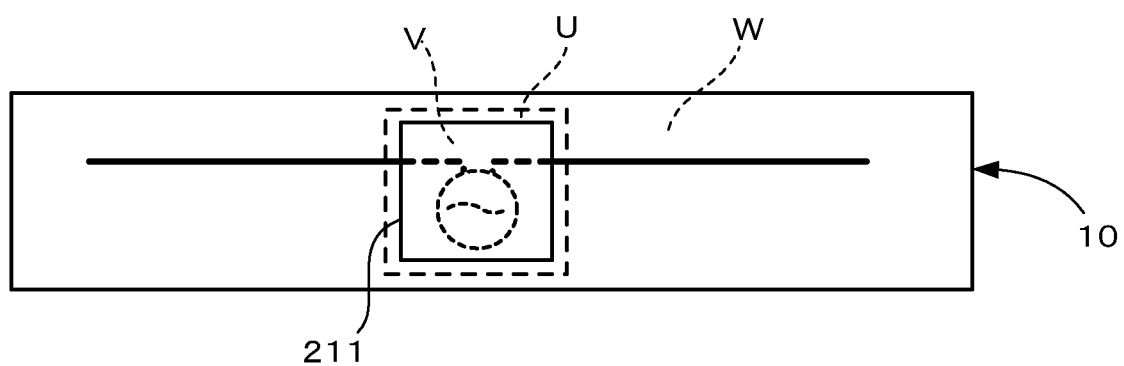
FIG. 6B is a plan view diagrammatically illustrating the regions where the cover members can be adhesively joined and the region where the cover members are not adhesively joined.

Next, the cover members (31 and 32) will be described further using FIGS. 6A and 6B. FIGS. 6A and 6B are a cross-sectional view and a plan view, respectively, diagrammatically illustrating regions (V and W) where the cover members (31 and 32) can be adhesively joined and regions (U) where the cover members (31 and 32) are not adhesively joined.

As illustrated in FIGS. 1 and 6A, the cover members (31 and 32) are sheet-like members for covering the inlay 10 provided with the reinforcing members (21 and 22) that are formed as described above. According to the present embodiment, the cover members (31 and 32) are each formed into a rectangular shape having substantially the same size as the inlay 10 in plan view.

However, the size of each cover member (31 or 32) is not limited to this example, and may be selected as appropriate in accordance with the embodiment. As long as the cover members (31 and 32) are larger than the external shape of the reinforcing members (21 and 22) to such an extent that the cover members can respectively cover the reinforcing members (21 and 22) when viewed in the up-down direction, the cover members (31 and 32) may also be smaller than the external shapes of the inlay 10 and the antenna 12.

Moreover, as will be described later, the cover members (31 and 32) may also be larger than the external shape of the inlay 10 to such an extent that the cover members can cover the entire inlay 10. Furthermore, as long as the cover members (31 and 32) can cover the reinforcing members (21 and 22) in a single direction, the cover members (31 and 32) may have approximately the same length as the reinforcing members (21 and 22) in another direction that is orthogonal to the single direction.

The cover members (31 and 32) are provided for the purpose of protecting the inlay 10 from an external force, and are adhesively joined to at least either of the inlay 10 and the respective reinforcing members (21 and 22) so as to cover the reinforcing members (21 and 22) when viewed in the up-down direction. Here, according to the present embodiment, the cover members (31 and 32) are adhesively joined to at least either of the inlay 10 and the respective reinforcing members (21 and 22) except for regions around the respective reinforcing members (21 and 22).

That is to say, as illustrated in FIGS. 6A and 6B, The cover members (31 and 32) are not adhesively joined in the regions U around the respective reinforcing members (21 and 22), and are adhesively joined to at least either the inlay 10 and the respective reinforcing members (21 and 22) in the other regions (V and W). The region U around each reinforcing member (21 or 22) refers to the region extending outward from an outer peripheral edge (211 or 221) of that reinforcing member (21 or 22) in the direction of a plane surrounding the outer peripheral edge (211 or 221).

The region U around each reinforcing member (21 or 22) is not limited, but may be set within a range extending outward from the outer peripheral edge (211 or 221) of that reinforcing member (21 or 22) for 0.1 mm or more and more preferably 0.4 mm or more in the above-described plane direction. The range of the region U around each reinforcing member (21 or 22) may be set as appropriate so as to enable an air layer S having a size that can suppress damage, such as breaking of the antenna 12, which will be described later, to be generated.

Therefore, the cover members (31 and 32) are not adhesively joined in the regions U around the respective reinforcing members (21 and 22), and are adhesively joined, with an adhesive or the like, in the regions V on the faces of the respective reinforcing members (21 and 22) and/or the regions W on the faces of the inlay 10 extending outside the regions U in the plane direction. For this reason, each cover member (31 or 32) is configured to be slidable on the inlay 10 in at least a non-adhesively-joined region containing the region U around the corresponding one of the reinforcing members (21 and 22). Thus, according to the present embodiment, when an external force due to, for example, bending or the like acts on the IC tag 1, the cover members (31 and 32) partially slide on the inlay 10 and can thereby disperse the force acting on the inlay 10.

It should be noted that, according to the embodiment shown by FIGS. 1 and 6A, the two cover members (31 and 32) are disposed on both the upper face side and the lower face side, respectively, of the inlay 10. However, if either of the reinforcing members (21 and 22) is not disposed, a corresponding one of the cover members (31 and 32) may be omitted. It is sufficient that a cover member is disposed on at least a side where a reinforcing member is disposed. That is to say, if a single reinforcing member is disposed, a single cover member may be disposed as well.

Moreover, the size and shape of the cover members (31 and 32) are not limited, and it is sufficient that the cover members (31 and 32) have such a size and shape that the cover members can cover the respective reinforcing members (21 and 22) when viewed in the up-down direction. Moreover, the material of the cover members (31 and 32) is not limited, and may be selected as appropriate in accordance with the embodiment. For example, resin materials, paper materials, and the like similar to those for the base material 13 and the reinforcing members (21 and 22) described above may be used as the material of the cover members (31 and 32). Moreover, a pliable sheet-like resin material may also be used for the cover members (31 and 32). In this case, flexibility and durability of the IC tag 1 can be secured. It should be noted that the cover members (31 and 32) are preferably formed of a relatively hard resin material, such as polyethylene, polyethylene terephthalate (PET), nylon, polycarbonate, an ABS resin, an AES resin, an epoxy resin, polypropylene (PP), or polyimide. In particular, the cover members (31 and 32) are preferably formed of a material that is hard to such an extent that gaps (air layers S), which will be described later, are formed at the outer peripheral edges of the respective reinforcing members (21 and 22).

Usage Method

The IC tag 1 that is configured as described above can be attached to an article using various methods, such as an adhesive, a pressure-sensitive adhesive, double-sided adhesive tape, and sewing. For example, the IC tag 1 may be attached to a relatively easily bendable product, such as a belt, a hose, a tube, a mat, or a garment. The IC tag 1 can be used to manage such products by means of the RFID (radio frequency identifier) technology.

Moreover, the IC tag 1 may be directly disposed within a product by using a pocket of a garment, for example, instead of using the above-described various methods. Furthermore, as will be described later, the IC tag 1 may be attached to an article in a state in which the IC tag 1 is contained in an enclosing member, or may be integrally molded with a rubber product together with an enclosing member. The IC tag 1 can be attached to various products.

Features

In the IC tag 1 according to the present embodiment, the two reinforcing members (21 and 22) and the inlay 10 are covered by the two cover members (31 and 32). However, in at least the regions U around the respective reinforcing members (21 and 22), the cover members (31 and 32) are not adhesively joined to the inlay 10. For this reason, the following effect can be achieved.

Figure 7:
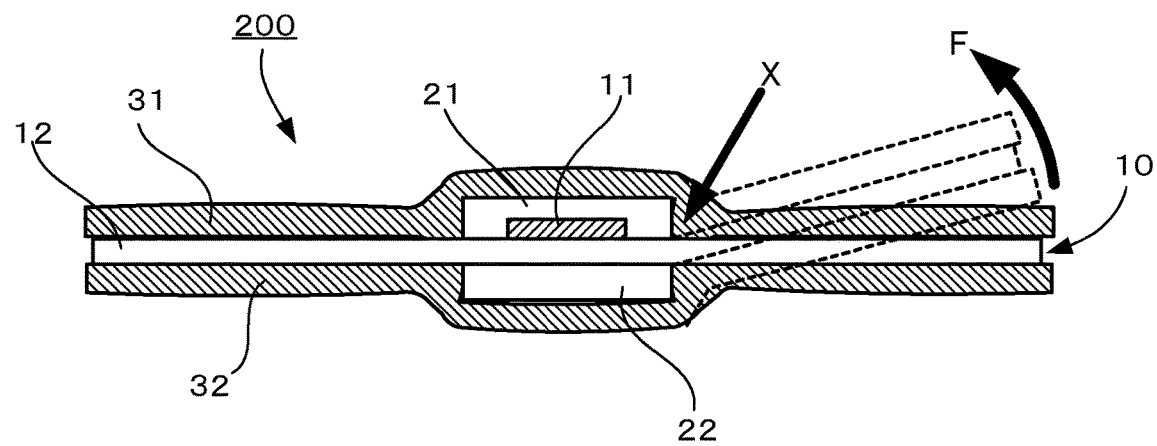
FIG. 7 is cross-sectional view diagrammatically illustrating how damage to the IC tag occurs.
Figure 8:
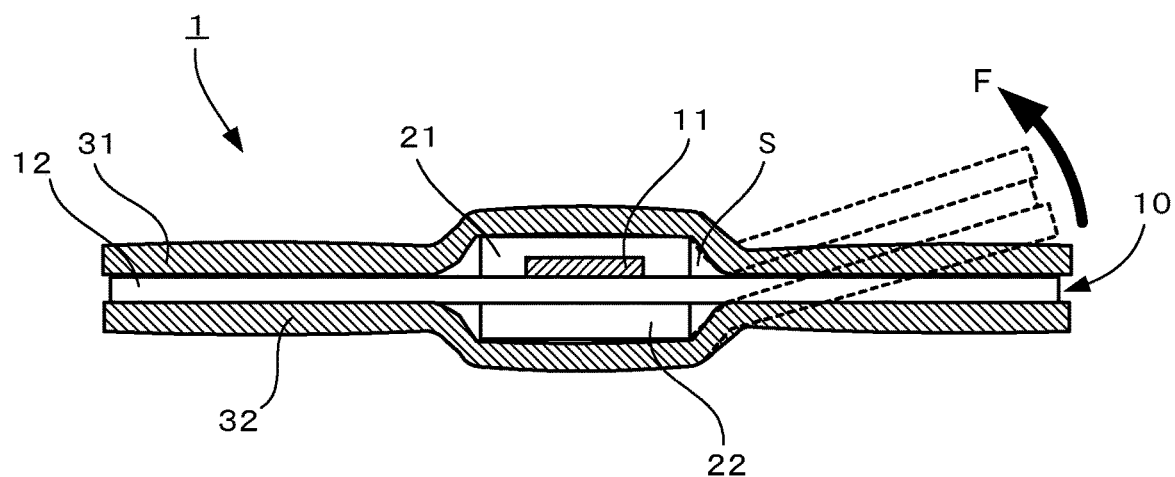
FIG. 8 is a cross-sectional view diagrammatically illustrating how the IC tag according to the embodiment bends.

Here, the effect of the present embodiment will be described using FIGS. 7 and 8. FIG. 7 is a cross-sectional view diagrammatically illustrating how an IC tag 200 bends, the IC tag 200 having a configuration in which the cover members (31 and 32) are adhesively joined to the inlay 10 with an adhesive in the regions around the respective reinforcing members (21 and 22). FIG. 8 is a cross-sectional view diagrammatically illustrating how the IC tag 1 according to the present embodiment bends. It should be noted that the IC tag 200 illustrated in FIG. 7 is the same as the above-described IC tag 1 except that the cover members (31 and 32) are adhesively joined to the inlay 10 with the adhesive around the respective reinforcing members (21 and 22).

As illustrated in FIG. 7, in the case where the cover members (31 and 32) are adhesively joined to the inlay 10 with the adhesive in regions containing the regions around the respective reinforcing members (21 and 22), the cover members (31 and 32) are in intimate contact with the inlay 10 around the respective reinforcing members (21 and 22). That is to say, side surfaces of peripheral edge portions of the reinforcing members (21 and 22) are continuously fixed to the inlay 10 via the respective cover members (31 and 32) and the adhesive.

Thus, in the IC tag 200, there is a significant difference in flexibility at the outer peripheral edge of each reinforcing member (21 or 22), in particular, at an inlay 10-side end portion X of the side surface of the peripheral edge portion, or in other words, at a boundary between a portion where the reinforcing member (21 or 22) is present and a portion where the reinforcing member (21 or 22) is absent, and consequently, the IC tag 200 can easily bend at this portion. For example, if an external force F illustrated in FIG. 7 is repeatedly exerted, the IC tag 200 is repeatedly bent near the end portion X of each reinforcing member (21 or 22), without bending in the other regions.

That is to say, the IC tag is subjected to repetitive bending at the outer peripheral edge of each reinforcing member (21 or 22), and accordingly, stress corresponding to the load exerted on the IC tag 1 is likely to concentrate in the outer peripheral edge of each reinforcing member (21 or 22). As a result, the stress that concentrates in the outer peripheral edge of each reinforcing member (21 or 22) may affect the inside of the inlay 10, thereby causing damage, such as breaking of the antenna 12, in this portion.

In contrast, according to the present embodiment, the cover members (31 and 32) are not adhesively joined to the inlay 10 around the respective reinforcing members (21 and 22). For this reason, even when the cover members (31 and 32) come into intimate contact with the inlay 10 due to the effect of adhesion in the regions W, the external force F, or the like, the side surfaces of the peripheral edge portions of the reinforcing members (21 and 22) are not continuously fixed to the inlay 10, and thus a gap, namely, the air layer S, illustrated in FIG. 8 is formed at the outer peripheral edge of each reinforcing member (21 or 22).

Therefore, an extreme change in the flexibility of the IC tag 1 at the outer peripheral edge of each reinforcing member (21 or 22) can be prevented by the effect of the air layer S. That is to say, repetitive bending of the IC tag 1 at the outer peripheral edge of each reinforcing member (21 or 22) can be suppressed. Thus, according to the present embodiment, even when the IC tag 1 bends under an external force F, the concentration of stress in the outer peripheral edge of each reinforcing member (21 or 22) can be alleviated due to the effect of the air layer S, and consequently, the occurrence of damage, such as breaking of the antenna 12, can be prevented.

In particular, in the case where the cover members (31 and 32) are formed of a hard resin material such as those described above, the cover members (31 and 32) can be made less likely to deform along the shape of the respective reinforcing members (21 and 22) during molding of the IC tag 1, and therefore, the air layer S is easily generated. For this reason, during molding, the occurrence of damage, such as breaking of the antenna 12, can be reliably prevented by the cover members (31 and 32) being formed of a hard resin material such as those described above.

Moreover, during attachment of the IC tag 1 to an article, pressure may be applied to the entire IC tag 1. In this case as well, the air layer S that is formed around each reinforcing member (21 or 22) can alleviate the concentration of pressure acting on this portion, so that the occurrence of damage, such as breaking of the antenna 12, during attachment of the IC tag 1 can be prevented.

Moreover, in the IC tag 1 according to the present embodiment, both faces of the IC chip 11 are respectively covered with the two reinforcing members (21 and 22), and both faces of the inlay 10 with the two reinforcing members (21 and 22) are respectively covered with the two cover members (31 and 32). That is to say, both faces of the inlay 10 are protected by the two reinforcing members (21 and 22) and the two cover members (31 and 32). For this reason, according to the present embodiment, a highly durable IC tag 1 can be obtained.

As described above, the IC tag 1 according to the present embodiment is highly durable against bending. For this reason, the IC tag 1 according to the present embodiment is suitably used as an IC tag to be attached to a relatively easily bendable product, such as a belt, a hose, a tube, a mat, or a garment, and is particularly advantageous.

IC Tag Container

Figure 9:
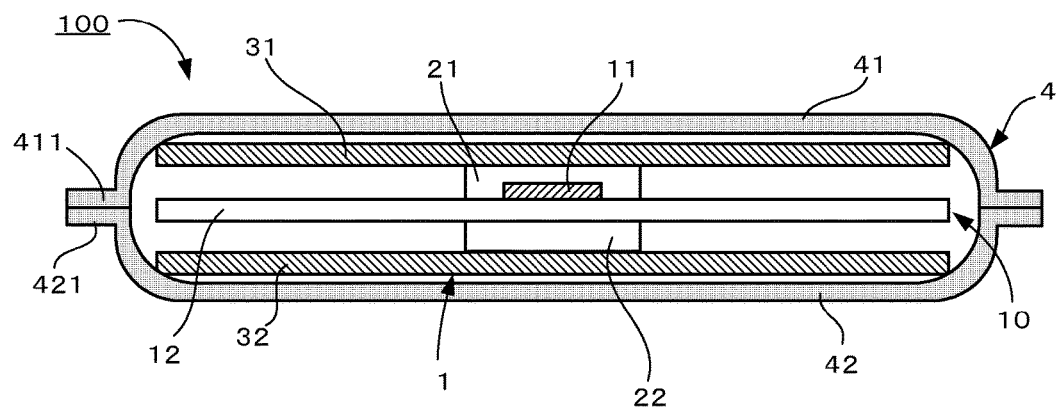
FIG. 9 is a cross-sectional view diagrammatically illustrating an IC tag container that contains the IC tag according to the embodiment.

Next, an IC tag container 100 using the above-described IC tag 1 will be described using FIG. 9. As illustrated in FIG. 9, the IC tag container 100 includes an enclosing member 4 that contains the above-described IC tag 1, that is, the inlay 10, the pair of reinforcing members (21 and 22), and the pair of cover members (31 and 32). It is sufficient that the enclosing member 4 is disposed on at least one face side of the inlay 10. The enclosing member 4 is configured to cover the IC tag 1.

According to the present embodiment, as illustrated in FIG. 9, the enclosing member 4 is formed into a bag-like shape having an internal space, by fixing peripheral edges (411 and 421) of a pair of sheet-like enclosing materials (41 and 42) to each other. The method for fixing the peripheral edges (411 and 421) of the enclosing materials (41 and 42) to each other is not limited, and may be selected as appropriate in accordance with the embodiment. For example, the peripheral edges (411 and 421) of the enclosing materials (41 and 42) can be fixed to each other by an adhesive or through welding using a high-frequency welder, heat sealing, or the like. As a result of the IC tag 1 being contained in the enclosing member 4 in this manner, damage to the IC tag 1 can be prevented. That is to say, the durability of the IC tag 1 can be increased.

The enclosing member 4 can be formed of various materials such as a woven fabric, a paper material, and the like. For example, the enclosing member 4 may be formed of a waterproof material, such as a urethane-, styrene-, olefin-, ester-, amide-, fluorine-, or vinyl chloride-based elastomer; a rubber such as nitrile rubber (NBR), chloroprene rubber (CR), chlorosulfonated polyethylene (CSM), isoprene rubber (IR), natural rubber (NR), butadiene rubber (BR), styrene-butadiene rubber (SBR), ethylene-propylene rubber (EPT), ethylene-propylene-diene rubber (EPDM), fluororubber (FKM), silicone rubber (Q), or urethane rubber (U); silicone; or other resin materials. In this case, intrusion of water into the IC tag container 100 can be prevented by sealing the peripheral edges (411 and 421) of the enclosing materials (41 and 42) together and thereby hermetically sealing the internal space formed by the two enclosing materials (41 and 42). Accordingly, with this configuration, a waterproof IC tag container 100 can be configured, and the IC tag 1 contained in this IC tag container 100 can be prevented from coming into contact with water.

For example, in the case where the IC tag 1 is attached to a garment, the IC tag 1 may be exposed to water while being bent, when the garment with the IC tag 1 attached thereto is washed, for example. With respect to this issue, with the above-described configuration, it is possible, for the foregoing reasons, to secure the waterproofness of the IC tag 1 while increasing the durability against bending. Thus, with the above-described configuration, it is possible to provide an IC tag applicable to an article, such as a garment, that is to be repeatedly subjected to bending and immersion in water.

Moreover, for example, the enclosing member 4 may be formed of a resin material, such as a urethane-, styrene-, olefin-, ester-, amide-, fluorine-, or vinyl chloride-based elastomer or a rubber such as nitrile rubber (NBR), chloroprene rubber (CR), chlorosulfonated polyethylene (CSM), isoprene rubber (IR), natural rubber (NR), butadiene rubber (BR), styrene-butadiene rubber (SBR), ethylene-propylene rubber (EPT), ethylene-propylene-diene rubber (EPDM), fluororubber (FKM), silicone rubber (Q), or urethane rubber (U). In this case, the shock resistance, the chemical resistance, the weather resistance, and the like of the IC tag 1 can be increased by the enclosing member 4 without impairing the flexibility of the IC tag 1. In particular, the chemical resistance and the weather resistance of the IC tag 1 can be increased by using a fluorine-based elastomer, fluororubber (FKM), or silicone rubber (Q) as the material of the enclosing member 4. Also, the weather resistance of the IC tag 1 can be increased by using a styrene-based elastomer, styrene-butadiene rubber (SBR), or ethylene-propylene-diene rubber (EPDM) as the material of the enclosing member 4.

Moreover, for example, the enclosing member 4 may also be formed of a fabric impregnated with rubber. The use of a fabric as the enclosing member 4 makes it possible to prevent generation of air bubbles because air escapes from gaps between threads, such as interstices or stitches, during integration with a rubber product 5 as will be described later. In addition, even if heat and pressure are applied to the fabric during integration with the rubber product 5, the fabric, unlike a rubber sheet, for example, does not soften and flow. Therefore, the shape (thickness) of the fabric remains substantially unchanged, and the dimensions thereof are unlikely to vary even if the integration with the rubber product 5 is performed under different temperatures, pressures, and other conditions. Thus, the fabric can be easily processed as designed. It should be noted that if a fabric that lacks stretchability is used, the bending resistance of the IC tag container 100 and the processability during molding with the rubber product 5, which will be described later, become poor. For this reason, it is preferable to use a fabric that has stretchability.

The fabric that has stretchability may be a woven fabric or may be a knitted fabric. In the case where the fabric is a woven fabric, it is sufficient that at least one of the warp and the weft is composed of threads that have stretchability. Examples of such threads that have stretchability include heat-shrunken threads (e.g., woolly threads and the like), spandex, and twisted threads. On the other hand, in the case where the fabric is a knitted fabric, stretchability can be imparted depending on the knitting pattern. Therefore, the threads that constitute the knitted fabric are not limited, and threads that have stretchability such as those described above may be used, or threads that do not have stretchability may be used.

The thickness of the fabric is not limited, and, for example, a fabric having an areal weight of preferably about 80 to 500 g/m² in terms of the areal weight of the raw fabric may be used. For example, durability including the bending resistance and the like can be improved even more by using a thick fabric such as sailcloth.

Rubber with which such fabric is impregnated (i.e., rubber contained in the enclosing materials (41 and 42)) is not limited, and may be selected as appropriate in accordance with the embodiment. Examples of the rubber with which such fabric is impregnated include nitrile rubber, chloroprene rubber, chlorosulfonated polyethylene, polybutadiene rubber, natural rubber, ethylene-propylene rubber (EPM), ethylene-propylene-diene rubber (EPDM), hydrogenated nitrile rubber (H-NBR), millable urethane, acrylic rubber, silicone rubber, fluororubber, and carboxylated nitrile rubber. These rubbers may be used alone or in combination of two or more. It is preferable that the rubber contained in the enclosing member 4 is an unvulcanized rubber.

The amount of rubber that is contained in the enclosing member 4 is not limited, as long as it is an amount that enables the enclosing member 4 to be adhesively joined to the rubber product 5, which will be described later. Although the amount of rubber that is contained in the enclosing member 4 varies depending on the type, thickness, and the like of the fabric, it is preferable that the fabric is impregnated with the rubber at a rate of about 50 to 300 g per 1 m² of the fabric. Moreover, in the case where the enclosing member 4 is formed by the pair of enclosing materials (41 and 42), the enclosing materials (41 and 42) may be formed of the same material or may be formed of different materials.

Attachment to Rubber Product

Next, a rubber product with an IC tag that can be produced by attaching the above-described IC tag container 100 to the rubber product 5 will be described further using FIGS. 10 to 13. FIGS. 10 to 13 are each a cross-sectional view diagrammatically illustrating a mode in which the above-described IC tag container 100 is attached to the rubber product 5.

Examples of the rubber product 5 with which the above-described IC tag container 100 is to be integrated include those that are at least partially formed of a rubber material, such as sheet-like products, such as mats and belts, tires, timing belts, base-isolating materials, joints, tubes, and hoses. The rubber product 5 corresponds to an "attachment target member" of the present invention. Examples of the rubber material include the above-described types of rubbers, and these types of rubbers may be used alone or in combination of two or more. Various additives such as a processing aid, a plasticizer, a coloring agent, an ultraviolet absorber, and an anti-aging agent, for example, may also be added to the rubber, as long as the effects of the present invention are not impaired.

It is preferable that the rubber that forms the rubber product 5 is an unvulcanized rubber. Preferably, the rubber that forms the rubber product 5 is the same type of rubber as the rubber contained in the enclosing member 4, and more preferably, both of these rubbers are unvulcanized rubbers. When the same type of rubbers is used, the rubber product 5 and the enclosing member 4 can be more easily adhesively joined together. When both of the rubbers are unvulcanized rubbers, the rubbers are vulcanized during integral molding, so that the rubber contained in the enclosing member 4 and the rubber product 5 can be adhesively joined together with higher adhesion. As a result, water is unlikely to reach the IC tag 1 contained in the internal space, and thus a rubber product with an IC tag with excellent water resistance can be obtained.

Figure 10:
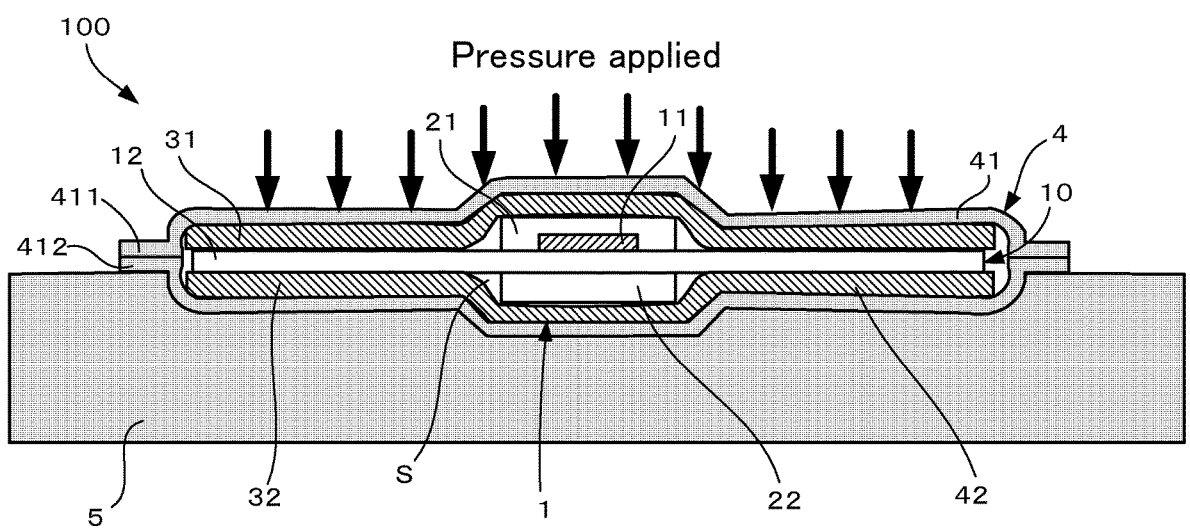
FIG. 10 is a cross-sectional view diagrammatically illustrating a mode in which the IC tag container according to the embodiment is attached to a rubber product.

In order to obtain such a rubber product with an IC tag, for example, the IC tag container 100 illustrated in FIG. 9 is prepared, and is disposed on a surface of the rubber product 5. Then, as illustrated in FIG. 10, integral molding processing (e.g., press molding) is performed under predetermined heating and pressure-applying conditions to adhesively join the rubber product 5 and the rubber contained in the enclosing member 4 to each other. Thus, the IC tag container 100 and the rubber product 5 can be integrated, and a rubber product with an IC tag can be obtained.

It should be noted that, for example, if the rubber product 5 or the rubber contained in the enclosing member 4 is unvulcanized, the unvulcanized rubber is vulcanized during this integral molding processing, and thus the enclosing member 4 and the rubber product 5 are adhesively joined to each other with high adhesion. Moreover, even when the rubber product 5 is a vulcanized product, the enclosing member 4 and the rubber product 5 are adhesively joined to each other with high adhesion. The reason for this is that, since the enclosing member 4 is composed of a fabric, the enclosing member 4 has a large number of minute protrusions and depressions, thereby exhibiting a high anchoring effect during adhesive joining.

Moreover, as a result of press molding, the cover members (31 and 32) deform along the inlay 10 and the respective reinforcing members (21 and 22). At this time, since the cover members (31 and 32) are not adhesively joined to the inlay 10 at least around the reinforcing members (21 and 22) as described above, the air layers S are formed between the inlay 10 and the respective cover members (31 and 32) around the respective reinforcing members (21 and 22).

Therefore, the concentration of pressure in the outer peripheral edges of the respective reinforcing members (21 and 22) during press molding can be alleviated for the above-described reasons, and consequently, the occurrence of damage, such as breaking of the antenna 12, due to press molding can be prevented. The IC tag container 100 and the rubber product 5 can be integrated in this manner.

It should be noted that the heating and pressure-applying conditions during integral molding processing are not limited. For example, with regard to the heating conditions, the temperature is set within a range of about 150 to 220° C., and is preferably set at a temperature that is required for an ordinary vulcanization process. The processing time is preferably about 3 to 30 minutes. Furthermore, with regard to the pressure-applying conditions during integral molding processing, preferably, the pressure is set within a range of about 0.2 to 5 MPa. If the enclosing member 4 and the rubber product 5 are to be adhesively joined to each other with high adhesion, it is preferable to perform the integral molding processing by applying a pressure of 0.5 MPa or more. Also, in the case where adhesive joining to a vulcanized rubber is performed as well, it is preferable to perform the processing under high-pressure conditions, and thus, it is preferable to apply a pressure of 0.5 MPa or more.

In the foregoing example, the IC tag container 100 is directly attached to the rubber product 5. However, the method for attaching the IC tag container 100 to the rubber product 5 is not limited to this example, and may be selected as appropriate in accordance with the embodiment. For example, the IC tag container 100 can be attached to the rubber product 5 using the following methods.

Figure 11:
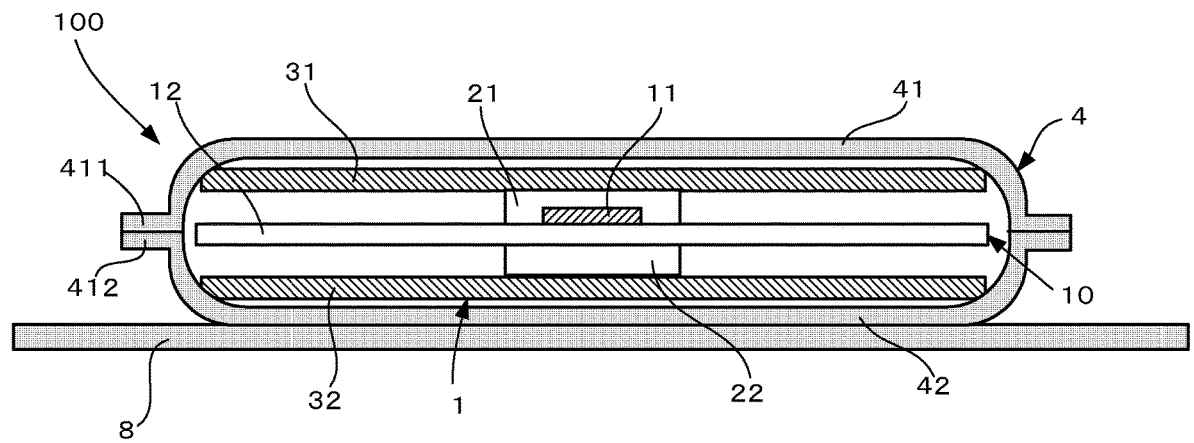
FIG. 11 is a cross-sectional view diagrammatically illustrating a mode in which the IC tag container according to the embodiment is attached to a rubber product.

That is to say, as illustrated in FIG. 11, the IC tag container 100 is disposed on a rubber sheet 8, and then, integral molding processing is performed in the same manner as described above. The rubber sheet 8 is formed of the same material as the above-described rubber product 5. Then, the IC tag container 100 and the rubber sheet 8 that have thus been integrally molded are attached to the rubber product 5. For example, the IC tag container 100 and the rubber sheet 8 can be attached to the rubber product 5 by fixing the rubber sheet 8 to the rubber product 5 via an adhesive.

Figure 12:
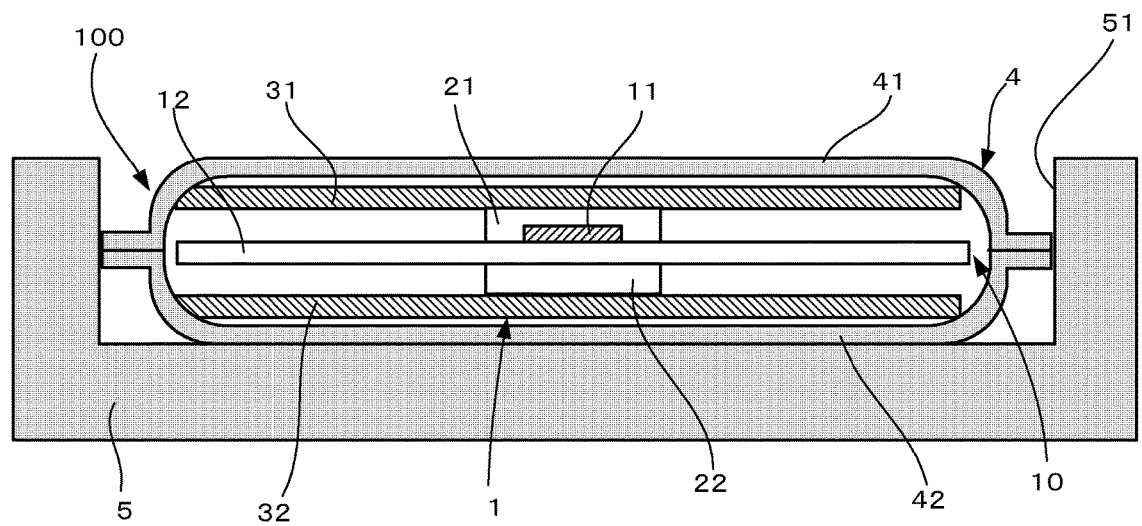
FIG. 12 is a cross-sectional view diagrammatically illustrating a mode in which the IC tag container according to the embodiment is attached to a rubber product.

Alternatively, as illustrated in FIG. 12, a recess 51 is formed in the rubber product 5, and the IC tag container 100 is disposed in this recess 51. Then, integral molding processing may be performed in the same manner as described above. It should be noted that FIGS. 11 and 12 each illustrate a state prior to integral molding.

Figure 13:
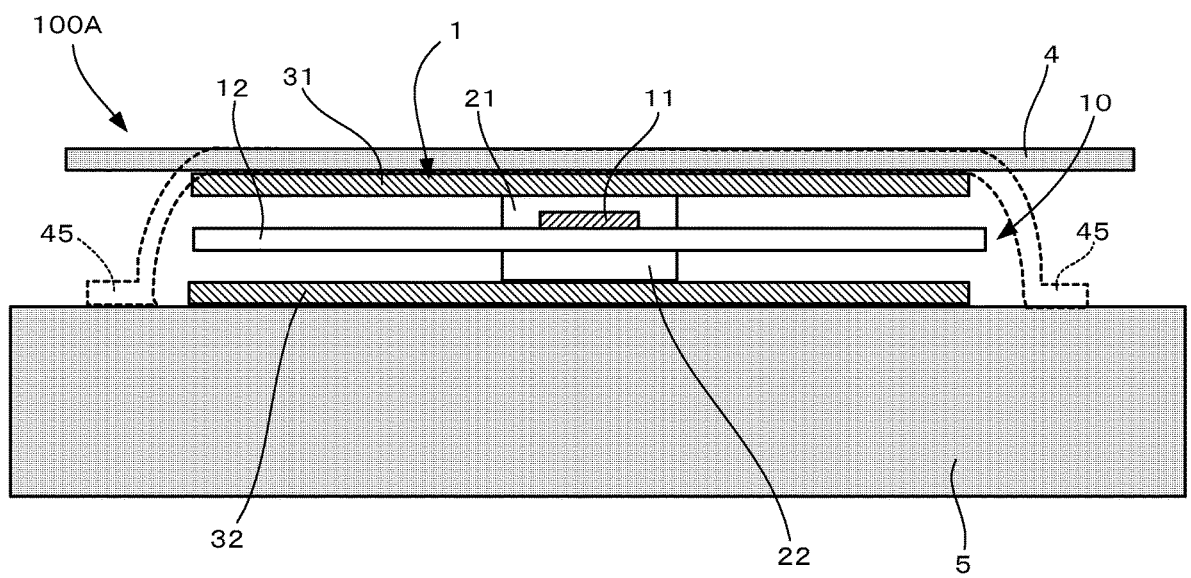
FIG. 13 a cross-sectional view diagrammatically illustrating another mode in which the IC tag container according to the embodiment is attached to a rubber product.

In the above-described IC tag container 100, the enclosing member 4 is formed into a bag-like shape. However, the shape of the enclosing member 4 is not limited to this example. For example, as illustrated in FIG. 13, the enclosing member 4 may be formed into a sheet-like shape. In an IC tag container 100A in this case, the enclosing member 4 covers only one face of the IC tag 1.

When this IC tag container 100A is to be attached to the rubber product 5, as illustrated in FIG. 13, the IC tag 1, that is, the inlay 10, the reinforcing members (21 and 22), and the cover members (31 and 32) are disposed on the rubber product 5, and the enclosing member 4 is disposed so as to cover them. Then, a peripheral edge portion 45 of the enclosing member 4 is fixed to the rubber product 5 (the state indicated by the dashed lines in FIG. 13) through the same integral molding processing as described above. With this mode as well, an IC tag container and a rubber product with an IC tag can be configured.

With the above-described IC tag containers (100 and 100A) as well as the above-described rubber product with an IC tag, the occurrence of damage to the contained IC tag, such as breaking of the antenna, due to bending can be prevented. Therefore, according to the present embodiment, an IC tag container that renders an IC tag highly durable and a rubber product with such an IC tag can be provided.

§ 3 Modifications

Although an embodiment of the present invention has been described above, the foregoing description should be considered in all respects as an exemplary illustration of the present invention. It goes without saying that various improvements and modifications can be made thereto without departing from the scope of the present invention. For example, the following changes can be made. It should be noted that in modifications that will be described below, the same constituent elements as those of the foregoing embodiment are denoted by the same reference numerals, and description thereof is omitted as appropriate. A plurality of modifications described below may be combined as appropriate.

3-1

For example, in the foregoing embodiment, the cover members (31 and 32) are not adhesively joined to the inlay 10 around the respective reinforcing members (21 and 22) so that the air layers S are formed around the respective reinforcing members (21 and 22), and with this configuration, this portion is suppressed from bending easily. In the foregoing embodiment, the occurrence of damage, such as breaking of the antenna 12, is prevented in this manner. However, the method for suppressing the portion around the reinforcing members (21 and 22) from bending easily is not limited to this example, and the following methods may also be used.

Figure 14:
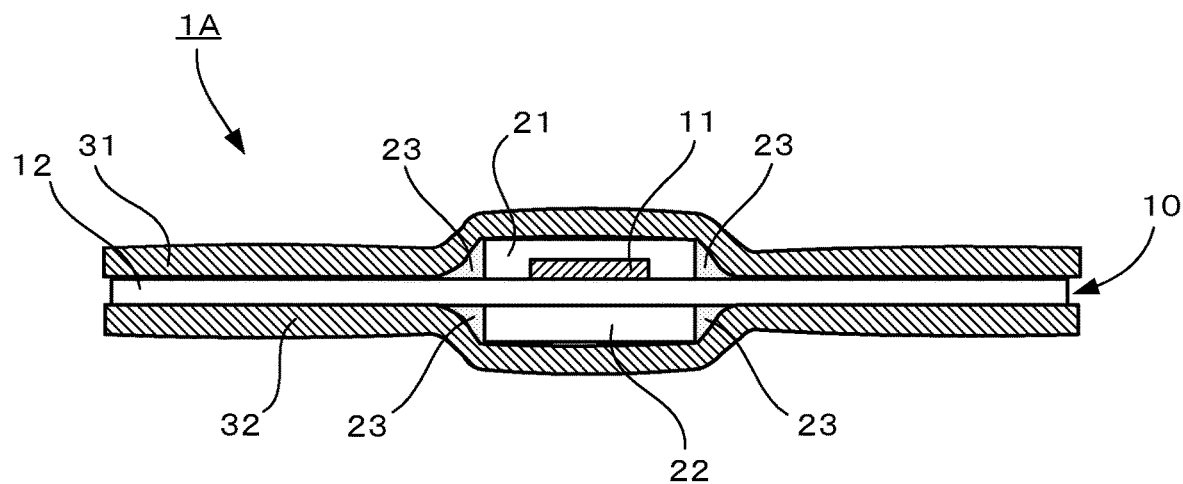
FIG. 14 is a cross-sectional view diagrammatically illustrating an IC tag according to another form.

For example, as illustrated in FIG. 14, the air layers S (gaps) may be filled with filling members 23 that are softer than the cover members (31 and 32). FIG. 14 is a cross-sectional view diagrammatically illustrating an IC tag 1A according to this modification. As illustrated in FIG. 14, the IC tag 1A has the same configuration as the above-described IC tag 1 except that gaps between the inlay 10 and the respective cover members (31 and 32) around the respective reinforcing members (21 and 22) are filled with the filling members 23 that are softer than the cover members (31 and 32).

Examples of the material of such relatively soft filling members 23 include an elastomer (elastic body), a gel-like substance, and the like having a JIS-A hardness of 70 degrees or less. The JIS-A hardness of the filling members 23 may be 0 degrees or more. A filling member 23 having a JIS-A hardness of 0 degrees refers to a gel-like substance. Moreover, foam and the like having cushioning properties can also be used as the material of the filling members 23, even when the foam and the like have a JIS-A hardness of 70 degrees or more. It should be noted that the JIS-A hardness can be measured using a type A durometer specified in JIS K6253.

Specifically, the filling members 23 may be, for example, a pressure-sensitive adhesive, foam, or the like. Examples of the foam include polyethylene foam, urethane foam, polypropylene foam, acryl foam, and the like. Moreover, an ordinary adhesive solidifies from being in a liquid state, thereby bonding an object to an adherend. In contrast, a pressure-sensitive adhesive refers to an adhesive that bonds an object to an adherend while maintaining an intermediate state between being an individual and a liquid without undergoing such change. Examples of the pressure-sensitive adhesive include pressure-sensitive adhesives based on rubbers such as natural rubber (NR), urethane rubber (U), ethylene-propylene-diene rubber (EPDM), silicone rubber (Q), chloroprene rubber (CR), and nitrile rubber (NBR).

In the IC tag 1A according to this modification, even when the cover members (31 and 32) come into intimate contact with the inlay 10, the filling members 23, which are softer than the cover members (31 and 32), are disposed at the outer peripheral edges of the respective reinforcing members (21 and 22). Thus, the filling members 23 have the same effect as the above-described air layers S, and the concentration of stress in the outer peripheral edges of the reinforcing members (21 and 22) can be alleviated even when the IC tag 1A bends under an external force. Therefore, according to this modification, the occurrence of damage, such as breaking of the antenna 12, can be prevented.

That is to say, the IC tag 1A according to the present modification is configured to prevent the occurrence of damage, such as breaking of the antenna 12, by substituting the filling members 23 for the air layers S (gaps) formed in the above-described IC tag 1. Similarly, the IC tag 1 is configured to prevent the occurrence of damage, such as breaking of the antenna 12, by filling the gaps at the outer peripheral edges of the reinforcing members (21 and 22) with air, which is softer than the cover members (31 and 32), and thereby alleviating the concentration of stress in the outer peripheral edges of the reinforcing members (21 and 22).

Figure 15:
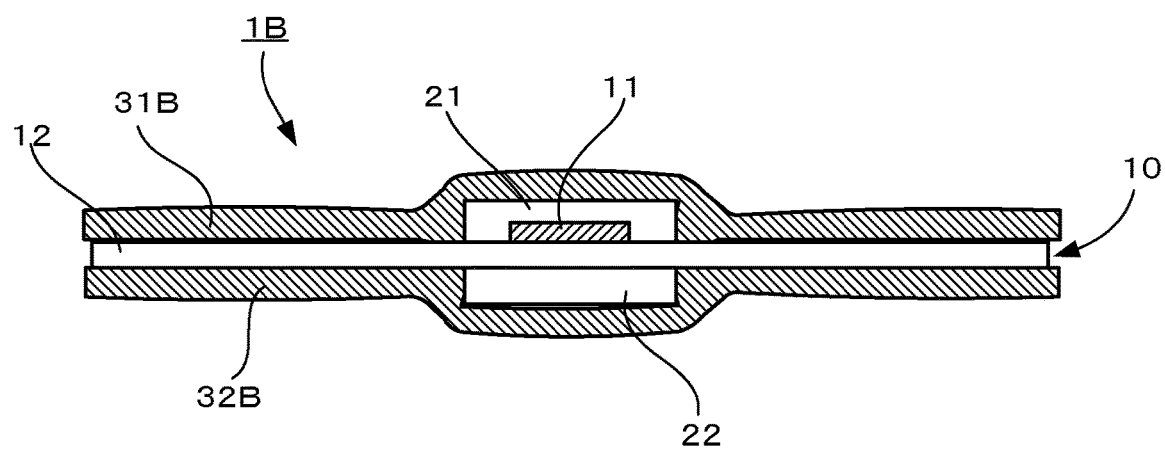
FIG. 15 is a cross-sectional view diagrammatically illustrating an IC tag according to another form.

Moreover, for example, as illustrated in FIG. 15, cover members (31B and 32B) may be formed of a flexible material. FIG. 15 is a cross-sectional view diagrammatically illustrating an IC tag 1B according to this modification. In the IC tag 1B in this case, a flexible material, such as foam or rubber, is used for the cover members (31B and 32B). Specifically, the cover members (31B and 32B) are formed of a flexible material having a JIS-A hardness of 90 degrees or less, such as a urethane-, styrene-, olefin-, ester-, amide-, fluorine-, or vinyl chloride-based elastomer or a rubber such as nitrile rubber (NBR), chloroprene rubber (CR), chlorosulfonated polyethylene (CSM), isoprene rubber (IR), natural rubber (NR), butadiene rubber (BR), styrene-butadiene rubber (SBR), ethylene-propylene rubber (EPT), ethylene-propylene-diene rubber (EPDM), fluororubber (FKM), silicone rubber (Q), or urethane rubber (U). At this time, the JIS-A hardness of the cover members (31B and 32B) may be 30 degrees or more. Also, in this IC tag 1B, as illustrated in FIG. 15, the cover members (31B and 32B) may also be adhesively joined to the inlay 10 in the regions around the respective reinforcing members (21 and 22).

In the IC tag 1B according to this modification, the cover members (31B and 32B) are formed of a flexible material. For this reason, when the cover members (31B and 32B) come into intimate contact with the inlay 10, the flexible cover members (31B and 32B) are disposed at the outer peripheral edges of the respective reinforcing members (21 and 22). Therefore, due to the flexibility of the cover members (31B and 32B), the concentration of stress in the outer peripheral edges of the reinforcing members (21 and 22) can be alleviated even when the IC tag 1B bends under an external force. Thus, according to this modification, the occurrence of damage, such as breaking of the antenna 12, can be prevented.

3.2

In the foregoing embodiment, the cover members (31 and 32) are formed to have substantially the same size as the inlay 10 in plan view. However, the size of the cover members (31 and 32) is not limited to this example. The cover members (31 and 32) may be formed to be larger than the external shapes of the inlay 10 and the respective reinforcing members (21 and 22) in plan view. In addition, in this case, the cover members (31 and 32) may be formed of a waterproof material and may contain the inlay 10 and the reinforcing members (21 and 22) in a hermetically sealed manner. This modification will be described below using FIGS. 16 and 17.

Figure 16:
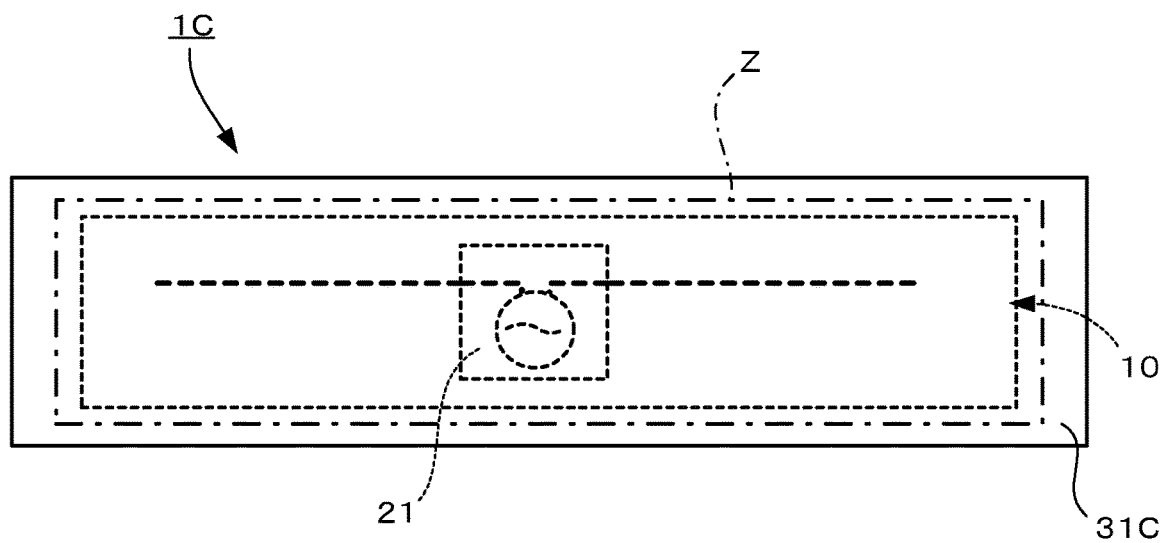
FIG. 16 is a plan view diagrammatically illustrating an IC tag according to another form.
Figure 17:
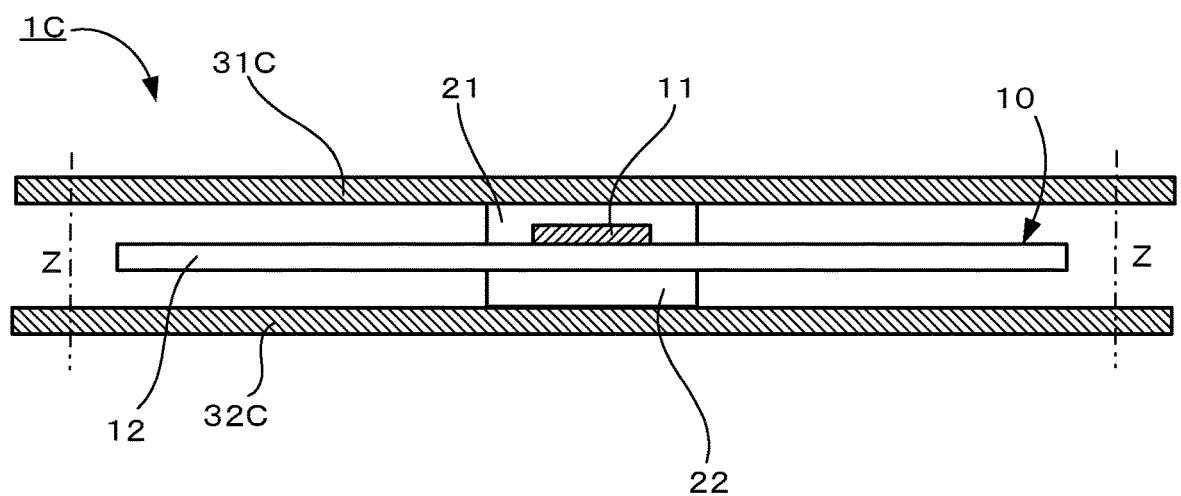
FIG. 17 is a cross-sectional view diagrammatically illustrating a region where both cover members of the IC tag according to the other form are sealed together.

FIG. 16 is a plan view diagrammatically illustrating an IC tag 1C according to the present modification. Also, FIG. 17 is a cross-sectional view diagrammatically illustrating a region where two cover members (31C and 32C) of the IC tag 1C according to the present modification are sealed together. As illustrated in FIGS. 16 and 17, the two cover members (31C and 32C) are sealed together in a region Z surrounding the inlay 10 and the reinforcing members (21 and 22) so as to form an internal space that contains the inlay 10 and the reinforcing members (21 and 22).

Thus, the inlay 10 and the reinforcing members (21 and 22) are hermetically sealed by the two cover members (31C and 32C) that are formed of a waterproof material. For this reason, according to this modification, the inlay 10 can be prevented from coming into contact with water. That is to say, a waterproof IC tag 1C can be configured. Therefore, according to this modification, an IC tag that is applicable to an article, such as a garment, to be repeatedly subjected to bending and immersion in water can be provided. It should be noted that examples of the waterproof material include fluorine-based resins, such as polytetrafluoroethylene (PTFE) and polyvinylidene fluoride (PVDF), polyethylene, polypropylene, polyimide, nylon, ethylene-vinyl acetate copolymer, polyvinyl chloride, silicone, and other resin materials.

3.3

Moreover, with regard to the various constituent elements of the IC tag 1, the IC tag containers (100 and 100A), and the rubber product with an IC tag that have been described above, omission, substitution, and addition of a constituent element may be performed as appropriate in accordance with the embodiment. For example, a constituent element may be omitted from or added to the above-described IC tag 1 as will be described below.

Figure 18:
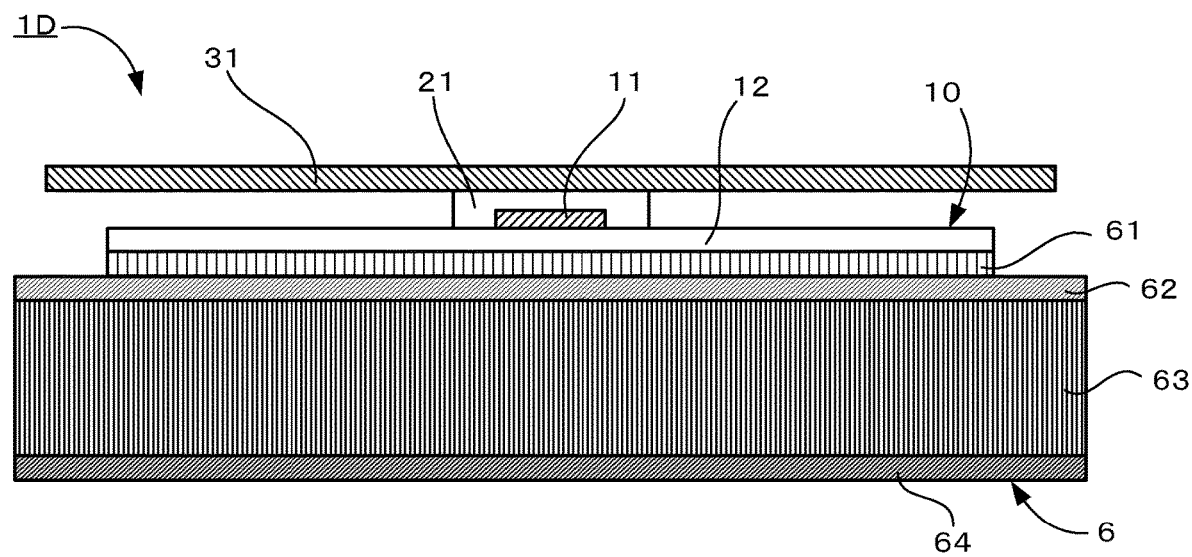
FIG. 18 is a cross-sectional view diagrammatically illustrating an IC tag according to another form.

FIG. 18 is a cross-sectional view diagrammatically illustrating an IC tag 1D according to the present modification. If the above-described IC tag 1 is disposed near a member that may interfere with communication (e.g., a conductive member such as metal, a dielectric member such as paper, glass, or liquid, or a magnetic member; hereinafter also referred to as "communication interfering member"), there is a possibility that the communicable range of the IC tag 1 will be shortened due to the effect of the communication interfering member. In contrast, according to this modification, a wireless communication improving sheet body 6 is attached to the IC tag 1D to reduce the effect of the above-described member and thereby improve wireless communication.

As illustrated in FIG. 18, the IC tag 1D according to this modification has a configuration in which the reinforcing member 22 and the cover member 32 are omitted from the above-described IC tag 1, and the wireless communication improving sheet body 6 is attached to the lower face side of the inlay 10. The wireless communication improving sheet body 6 includes a first dielectric layer 61, an antenna layer 62, a second dielectric layer 63, and a shielding layer 64 in this order from the side on which the IC tag 1D is attached.

The first dielectric layer 61 is formed of an insulating material, such as rubber, a thermoplastic elastomer, plastic, wood, paper, a pressure-sensitive adhesive, or an adhesive, and insulates the IC tag 1D and the antenna layer 62 from each other. The first dielectric layer 61 is preferably formed of a material with low energy loss, and may be formed of, for example, a material having a dielectric loss tangent of 0.2 or less and more preferably 0.05 or less at the frequency of electromagnetic waves that are used for wireless communication by the IC tag 1D. It should be noted that the dimensions of the first dielectric layer 61 may be set as appropriate in accordance with the embodiment.

The antenna layer 62 is formed of a conductive material such as aluminum or copper. The antenna layer 62 is configured, as appropriate, to resonate with electromagnetic waves having the same frequency as the electromagnetic waves used for wireless communication of the IC tag 1D, and to thereby activate electromagnetic coupling with the IC tag 1D. To achieve such effects, for example, the antenna layer 62 is provided with a hole (slot), a cutout (slit), or the like. It should be noted that the dimensions of the antenna layer 62 may be set as appropriate in accordance with the embodiment.

The second dielectric layer 63 is formed of an insulating material similar to those of the above-described first dielectric layer 61, and insulates the antenna layer 62 and the shielding layer 64 from each other. Moreover, the shielding layer 64 is formed of a conductive material similar to those of the above-described antenna layer 62. The shielding layer 64 is a layer that is to come into contact with the attachment target member. The shielding layer 64 functions as a ground. For example, when the attachment target member is a communication interfering member such as those described above, the shielding layer 64 cuts off an electromagnetic effect that this communication interfering member has on the IC tag 1D and the wireless communication improving sheet body 6. The dimensions of the second dielectric layer 63 and the shielding layer 64 may be set as appropriate in accordance with the embodiment. The layers 61 to 64 may be adhesively joined to each other as appropriate via an adhesive, a pressure-sensitive adhesive, or the like.

With this wireless communication improving sheet body 6, the shielding layer 64 makes it possible to cut off an effect from a communication interfering member. Moreover, the antenna layer 62 makes it possible to improve the communicable range of the IC tag 1D. Specifically, the antenna layer 62, the second dielectric layer 63, and the shielding layer 64 together constitute a microstrip antenna that resonates at the frequency of the electromagnetic waves used for communication by the IC tag 1D, and function as an auxiliary antenna that assists the IC tag 1D in wireless communication. Thus, the communicable range of the IC tag 1D can be improved.

It should be noted that the configuration of the wireless communication improving sheet body 6 is not limited to this example, and omission, substitution, and addition of a constituent element may be performed as appropriate in accordance with the embodiment. For example, each of the layers 61 to 64 of the wireless communication improving sheet body 6 may be configured to be slidable against the layer adjacent to that layer. In this case, the wireless communication improving sheet body 6 can be easily bonded to a curved article. Moreover, in the case where the wireless communication improving sheet body 6 is to be bonded to a metal surface, the shielding layer 64 may be omitted.

3.4

In the foregoing embodiment, the inlay 10 may or may not include the protective sheets (14 and 15). For this reason, the cover members (31 and 32) may cover the inlay 10 via the respective protective sheets (14 and 15) or may directly cover the inlay 10.

Moreover, in the IC tag container 100 according to the foregoing embodiment, the cover members (31 and 32) that are flat prior to integral molding processing deform so as to conform to the inlay 10 and the respective reinforcing members (21 and 22) through the integral molding processing. However, as long as the air layers S are formed around the respective reinforcing members (21 and 22), the cover members (31 and 32) prior to integral molding processing may have such shapes that conform to the inlay 10 and the respective reinforcing members (21 or 22).

Moreover, any of various types of inlays that include an IC chip to be protected with a reinforcing member can be used as the above-described inlay 10. For example, the antenna 12 may be, instead of a dipole antenna, another type of antenna such as a patch antenna. Also, the shape of the inlay 10 is not limited, and in addition to an elongated shape such as that described above, various shapes including a rectangular shape, a circular shape, a polygonal shape, and the like can be adopted in accordance with the use.

3.5

Moreover, in the foregoing embodiment, the reinforcing member members (21 and 22) are respectively disposed on the upper face and the lower face of the inlay 10 such that one reinforcing member is disposed on either face. However, the number of reinforcing members disposed on each of the upper and lower faces of the inlay 10 is not limited to one, and may be more than one. For example, a plurality of reinforcing members may be disposed as shown in FIG. 19A.

Figure 19A:
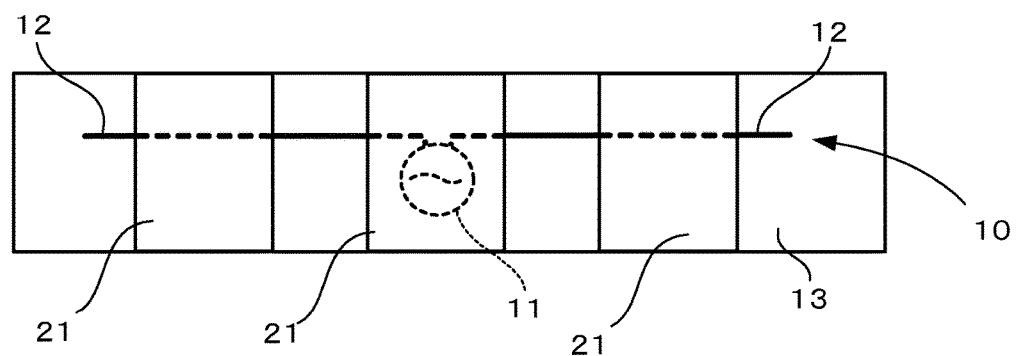
FIG. 19A is a plan view diagrammatically illustrating a state in which reinforcing members are attached to an inlay of an IC tag according to another form.

FIG. 19A diagrammatically illustrates a state in which three reinforcing members 21 are attached to the upper face of the inlay 10 according to the present modification. In FIG. 19A, the reinforcing member 21 at the center is disposed so as to cover the IC chip 11, and the other two reinforcing members 21 are arranged spaced to the left and right of the central reinforcing member 21. In this manner, each reinforcing member is not necessarily required to be disposed on the IC chip 11, but may be disposed spaced to the left or right of the IC chip 11. It should be noted that the same holds true for the lower face of the inlay 10.

Moreover, in the foregoing embodiment, in order to protect the IC chip 11, the reinforcing members (21 and 22) are disposed so as to cover the IC chip 11 when viewed in the up-down direction. However, as long as the IC chip 11 can be protected, the positions of the reinforcing members (21 and 22) are not limited to this example, and may be selected as appropriate in accordance with the embodiment. For example, reinforcing members can be arranged as shown in FIGS. 19B and 19C.

Figure 19B:
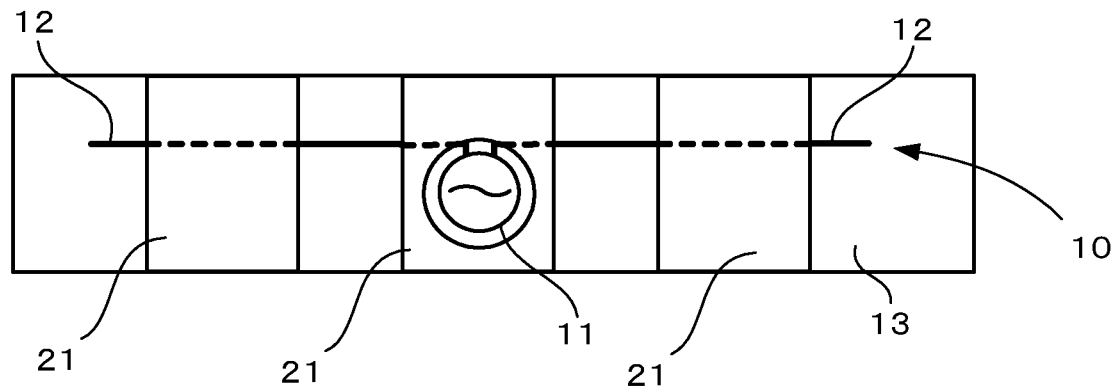
FIG. 19B is a plan view diagrammatically illustrating a state in which reinforcing members are attached to an inlay of an IC tag according to another form.
Figure 19C:
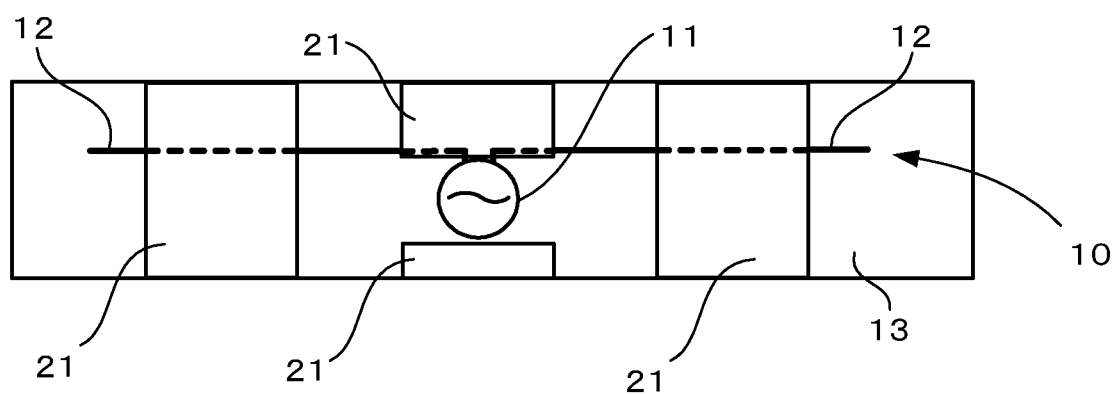
FIG. 19C is a plan view diagrammatically illustrating a state in which reinforcing members are attached to an inlay of an IC tag according to another form.

FIGS. 19B and 19C each diagrammatically illustrate a state in which reinforcing members 21 are arranged on the upper face of the inlay 10 according to the present modification near and around the IC chip 11. In FIG. 19B, a hole is formed in the central reinforcing member 21 at a portion thereof that is located directly above the IC chip 11, and thus, the central reinforcing member 21 is configured to surround the IC chip 11. Similarly, in FIG. 19C, a central region of the central reinforcing member that is located directly above the IC chip 11 is cut away, and thus, the central reinforcing member is configured to sandwich the IC chip 11 in a front-rear direction.

In the case where a reinforcing member 21 is disposed near and around the IC chip 11 as described above, a gap is created between the IC chip 11 and the cover member 31 due to the thickness of the reinforcing member 21. This gap serves as a cushion and can prevent an external force from directly acting on the IC chip 11. That is to say, this gap can protect the IC chip 11. Therefore, in order to protect the IC chip 11, the reinforcing members (21 and 22) may also be disposed near and around the IC chip 11 in such a manner as illustrated in FIG. 19B or 19C, instead of being disposed so as to cover the IC chip 11. It should be noted that in the IC tag illustrated in FIG. 19C, either the front portion or the rear portion of the reinforcing member 21 that is disposed at the center may be omitted (removed) (Example 17, which will be described later).

Figure 19D:
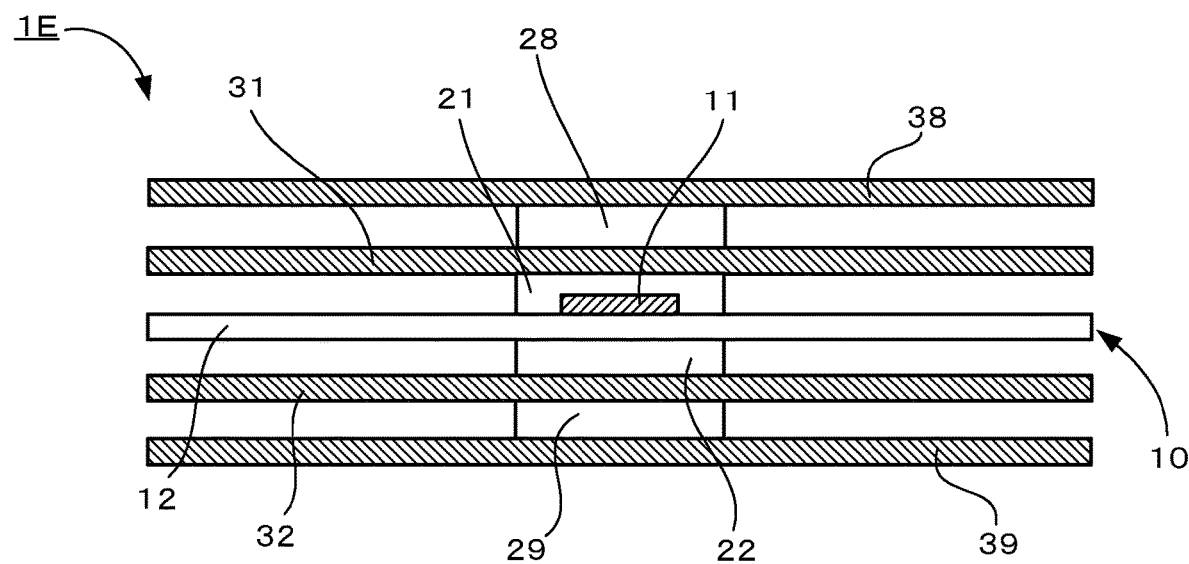
FIG. 19D is a cross-sectional view diagrammatically illustrating an IC tag according to another form.

Moreover, as illustrated in FIG. 19D, a plurality of reinforcing members and a plurality of cover members may be arranged in the up-down direction. FIG. 19D is a cross-sectional view diagrammatically illustrating an IC tag 1E according to the present modification. The IC tag 1E includes four reinforcing members (21, 22, 28, and 29) and four cover members (31, 32, 38, and 39). In addition, two of the reinforcing members and two of the cover members are alternatingly arranged on each of both faces of the IC chip 11 (inlay 10).

Specifically, the reinforcing member 21, the cover member 31, the reinforcing member 28, and the cover member 38 are stacked in this order on the upper face side of the inlay 10. The reinforcing member 28 and the cover member 38 are arranged in the same manner as the reinforcing member 21 and the cover member 31 except for being located on the upper face side of the cover member 31. On the other hand, the reinforcing member 22, the cover member 32, the reinforcing member 29, and the cover member 39 are stacked in this order on the lower face side of the inlay 10. The reinforcing member 29 and the cover member 39 are arranged in the same manner as the reinforcing member 22 and the cover member 32 except for being located on the lower face side of the cover member 32.

The durability of an IC tag may also be improved by alternatingly stacking a plurality of reinforcing members and a plurality of cover members in this manner. It should be noted that in FIG. 19D, two reinforcing members and two cover members are stacked on each face of the inlay 10; however, the number of reinforcing members stacked and the number of cover members stacked are not limited to two, and may be three or more. Moreover, the number of reinforcing members and the number of cover members may be different from each other. It should be noted that in the case where a plurality of reinforcing members are stacked in the up-down direction as described above, the sum of the thicknesses of the plurality of reinforcing members may be set at, for example, 100 μm to 1000 μm on each of both faces of the inlay 10.

EXAMPLES

Hereinafter, examples of the present invention will be described. However, the present invention is not limited to the examples below.

1. Regarding Embodiment

Preparation of Examples and Comparative Examples

Rubber products with respective IC tags according to Examples 1 to 4 corresponding to the foregoing embodiment and a comparative example were prepared as described below.

Example 1

Example 1 is constituted by the following members.
Inlay: ALN-9640-FRA manufactured by ALIEN TECHNOLOGY.
First and second protective sheets: A pair of pieces of PET tape (PF-075H manufactured by DIC Corporation) constituted by a PET base material with a thickness of 0.075 mm and a pressure-sensitive adhesive with a thickness of 0.035 mm, each piece having the same size as the base material of ALN-9640-FRA.
First and second reinforcing members: PET films (Bellclear GAG manufactured by Mitsui Chemicals, Inc.) having dimensions of 7 mm by 6 mm and a thickness of 0.5 mm.
First and second cover members: Pieces of paper (manufactured by Sun A. Kaken Co., Ltd.) having the same size as the base material of the inlay and having a thickness of 0.05 mm. Note that silicone coating is applied to a side of each piece of paper that faces the inlay.
Enclosing member (first and second enclosing materials): Composed of a pair of sheet-like enclosing materials (woven fabrics made of nylon 66 and impregnated with NBR, 2/2 twill) having a thickness of 1 mm.
Rubber product: A sheet made of NBR and having a thickness of 3 mm.

Example 1 was produced in the following manner using the above-described members. First, the inlay was sandwiched between the pair of protective sheets via a pressure-sensitive adhesive, and furthermore, the reinforcing members were fixed onto the respective protective sheets with an adhesive. The reinforcing members were disposed so as to cover the IC chip of the inlay. Thus, an inlay provided with reinforcing members was produced.

Figure 20:
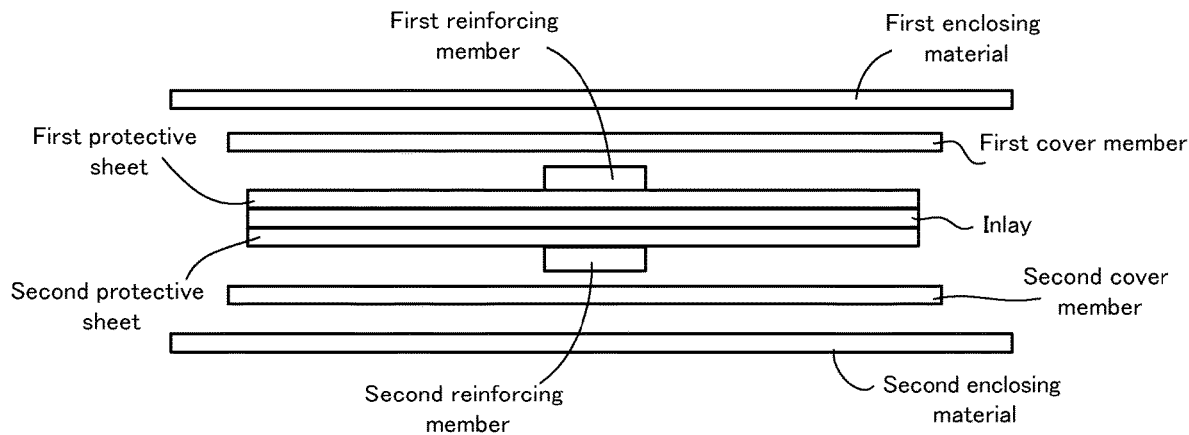
FIG. 20 is a cross-sectional view for explaining a method for producing an IC tag according to an example of the present invention.

Next, as shown in FIG. 20, the first enclosing material, the first cover member, the inlay provided with the reinforcing members, the second cover member, and the second enclosing material were stacked in this order. Here, the first cover member was fixed to a face (upper face in FIG. 20) of the first reinforcing member with a pressure-sensitive adhesive, and the second cover member was fixed to a face (lower face in FIG. 20) of the second reinforcing member with a pressure-sensitive adhesive. That is to say, the cover members were not adhesively joined to the inlay around the respective reinforcing members.

Then, peripheral edges of the first enclosing material and the second enclosing material were welded to each other using a high-frequency welder to obtain an IC tag container. Subsequently, the IC tag container and the rubber product were subjected to integral molding processing to produce a rubber product with an IC tag, such as that shown in FIG. 11. The processing was performed for 6 minutes under the heating and pressure-applying conditions of 200° C. and 0.3 MPa.

Example 2

Pieces of paper having a thickness of 0.075 mm were used as the protective sheets. Otherwise, the configuration of this example was the same as that of Example 1.

Example 3

PET films having a thickness of 0.1 mm were used as the protective sheets. Otherwise, the configuration of this example was the same as that of Example 1.

Example 4

PET films (PET100X1-V4 manufactured by Nippa Corporation) having a thickness of 0.1 mm were used as the cover members. Note that silicone coating was applied to a side of each PET film that faces the inlay. Otherwise, this example was the same as Example 1.

Example 5

Pieces of double-sided adhesive tape with a PET base material (Neo Fix 300 manufactured by Nichiei Kakoh Co., Ltd.) having a total thickness of 0.3 mm, with the PET of the base material having a thickness of 0.25 mm, were used as the reinforcing members, and PET films (Lumirror S10 manufactured by Toray Industries, Inc.) having a thickness of 0.1 mm were used as the cover members. Otherwise, this example was the same as Example 1.

Comparative Example

With respect to the configuration of Example 1, the pair of cover members were not used, and PET films having a thickness of 0.075 ■ were used as the protective sheets. Otherwise, the configuration of this comparative example was the same as that of Example 1.

Evaluation Test

Five each of the rubber products with respective IC tags obtained in Examples 1 to 5 and the comparative example were prepared and subjected to repetitive flexing using a De Mattia flex tester (FT-1524 manufactured by Ueshima Seisakusho Co., Ltd.). After that, the readable ranges for 800 to 1000 Hz were measured using a Tagformance Lite (output power: 3.28 W EIRP), and it was confirmed that the readable ranges had not decreased. The conditions for the flex test were as follows. It should be noted that "rear projection" means that the rubber product side of a rubber product with an IC tag is mountain-folded during flexing, whereas "front projection" means that the enclosing material side of the IC tagged rubber product is mountain-folded during flexing.

Test temperature: 23±2° C.

Reciprocating motion: 300 cycles/minute Distance between clamps: 78 mm at the maximum (stretched to the maximum), 18 mm at the minimum (flexed to the maximum)

Stroke: 60 mm

Number of flexes: (1) rear projection: 1000 flexes→front projection: 1000 flexes, (2) rear projection: 2000 flexes-→front projection: 2000 flexes, and (3) rear projection: 12000 flexes→front projection: 12000 flexes The results were as described below. Table 1 shows the number of tested samples that did not exhibit a decrease in readable range, out of the five samples that were tested.

TABLE 1

|  | Number of flexes (1) | Number of flexes (2) | Number of flexes (3) |
|---|---|---|---|
| Example 1 | 5 | 5 | 4 |
| Example 2 | 5 | 5 | 4 |
| Example 3 | 5 | 5 | 4 |
| Example 4 | 5 | 5 | 5 |
| Example 5 | 5 | 5 | 5 |
| Comparative Example | 0 | 0 | 0 |

As shown in Table 1, when the test regarding the readable range was conducted after the flex test, it was found that, with respect to those tests in which the number of flexes was 1000 or 2000, all of the five samples of each of Examples 1 to 5 exhibited substantially the same readable range as the readable range prior to the flex test. Meanwhile, all the samples of the comparative example exhibited a decrease in readable range as compared with the readable range prior to the flex test. Accordingly, it was found that Examples 1 to 5 had excellent durability. On the other hand, with regard to the comparative example, it is considered that since no cover members were used, the enclosing materials directly pressed against the reinforcing members and the inlay, and as a result, damage such as breaking of the antenna pattern of the inlay occurred.

Moreover, the number of flexes was further increased, and the test was conducted with the number of flexes being set at 12000. All of the samples of Example 4, in which the cover members were formed of the resin films, did not exhibit a decrease in readable range. Meanwhile, one sample out of the five samples of each of Examples 1 to 3, in which the cover members were formed of paper, exhibited a decrease in readable range. However, with regard to the number of flexes, 12000 is such an extremely large number of flexes that is not usually expected in usage of a rubber product, for example. Therefore, it can be said that Examples 1 to 3, which did not exhibit a decrease in readable range in the flex test in which the number of flexes was 2000, also had sufficient durability. Then, it was found that Examples 4 and 5, which did not show a deterioration in performance even in the flex test in which the number of flexes was 12000, had extremely high durability.

2. Regarding Modifications

Preparation of Examples

Next, IC tags according to Examples 6 to 15 corresponding to the above-described modifications were prepared as described below.

Examples 6 to 8

Figure 21:
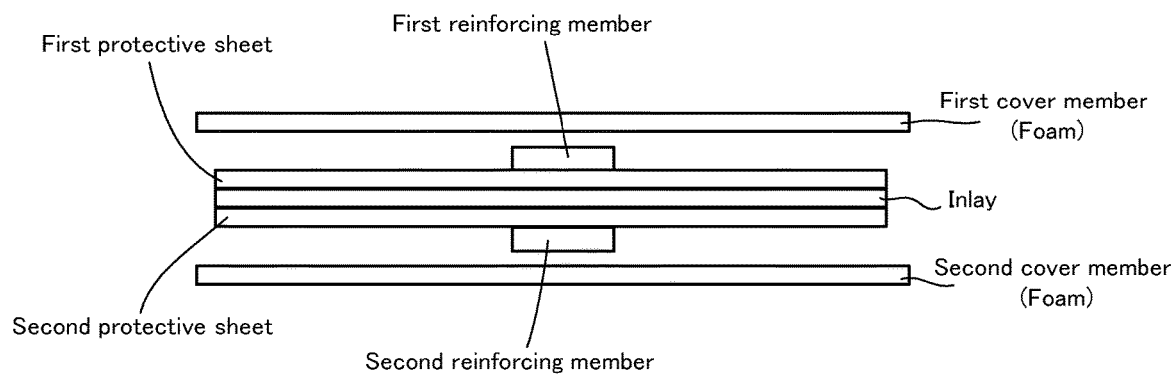
FIG. 21 is a cross-sectional view for explaining a method for producing an IC tag according to an example of the present invention.

First, as illustrated in FIG. 21, IC tags according to Examples 6 to 8 were produced by substituting a foam (XLIM manufactured by Sekisui Chemical Co., Ltd.) for each of the first and second cover members of Example 5. Here, in Example 6, a foam having a thickness of 0.3 mm was used. In Example 7, a foam having a thickness of 0.5 mm was used. In Example 8, a foam having a thickness of 0.7 mm was used. Moreover, the foams used in Examples 6 to 8 were measured using a type C durometer (ASKER rubber hardness tester C type, manufactured by Kobunshi Keiki Co., Ltd.) specified in JIS K7312. The foams of Examples 6 to 8 had a hardness (type C) of 34 degrees. Therefore, the foams of Examples 6 to 8 had a JIS-A hardness of 90 degrees or less. It should be noted that the configurations of the IC tags according to Examples 6 to 8 were otherwise the same as that of Example 5.

Examples 9, 10, and 12

Figure 22:
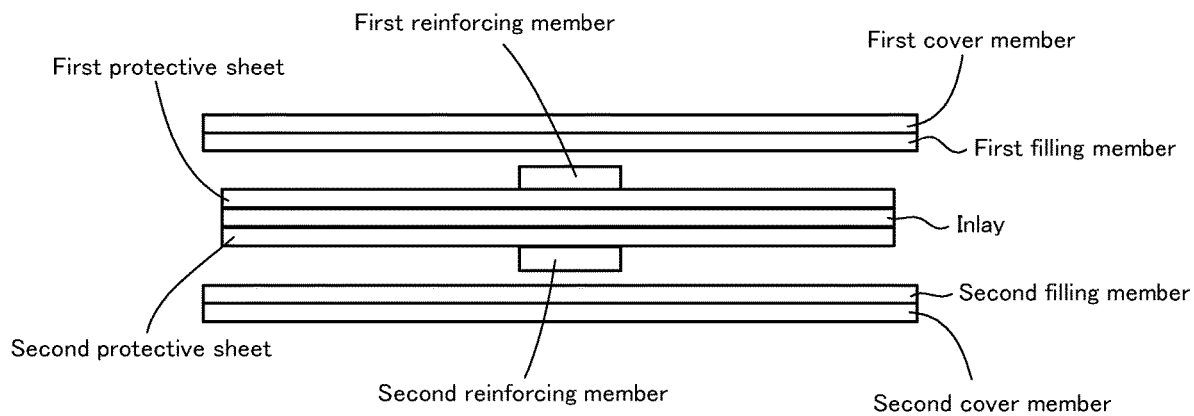
FIG. 22 is a cross-sectional view for explaining a method for producing an IC tag according to an example of the present invention.

Next, as illustrated in FIG. 22, IC tags according to Examples 9, 10, and 12 were produced by adding first and second filling members to the IC tag according to Example 5 above, the first and second filling members being softer than the cover members (Lumirror S10 manufactured by Toray Industries, Inc., thickness: 0.1 mm, without silicone coating). Specifically, the first filling member was disposed between the first cover member and the first reinforcing member of Example 5 above, and the second reinforcing member was disposed between the second cover member and the second reinforcing member.

Here, in Example 9, foams (XLIM manufactured by Sekisui Chemical Co., Ltd.) having the same dimensions as the cover members in plan view and a thickness of 0.5 mm were used as the filling members. The foams were fixed to the faces of the respective reinforcing members with a pressure-sensitive adhesive, but were not fixed to the cover members.

In Example 10, pieces of double-sided adhesive tape with a foam base material (WF170R manufactured by Konishi Co., Ltd.) having the same dimensions as the cover members in plan view were used as the filling members. In Example 12, pieces of double-sided adhesive tape without a base material (9627 manufactured by 3M Japan Limited) having the same dimensions as the cover members in plan view were used as the filling members. It should be noted that the configurations of the IC tags according to Examples 9, 10, and 12 were otherwise the same as that of Example 5.

Examples 11 and 13

Figure 23:
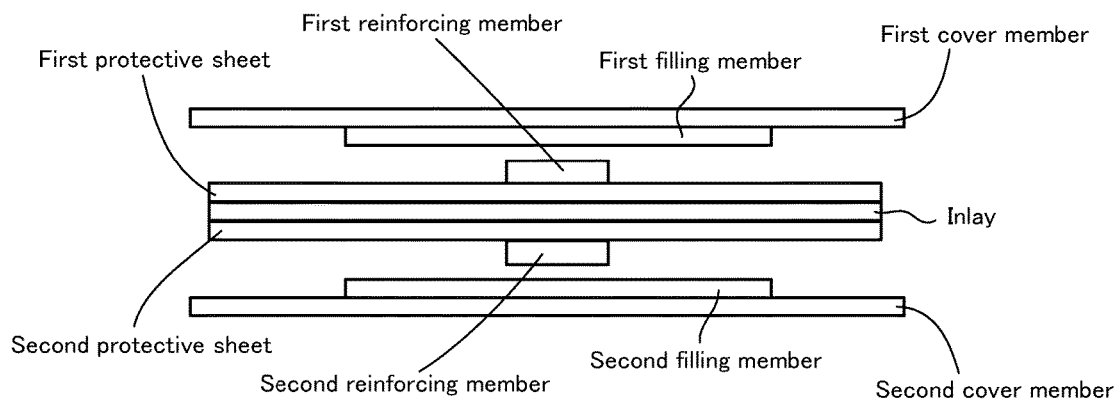
FIG. 23 is a cross-sectional view for explaining a method for producing an IC tag according to an example of the present invention.

Next, as illustrated in FIG. 23, IC tags according to Examples 11 and 13 were produced by changing the length of the filling members in the left-right direction of respective Examples 10 and 12 above to 9 mm. That is to say, in Example 11, pieces of double-sided adhesive tape with a foam base material (WF170R manufactured by Konishi Co., Ltd.) having a length of 9 mm in the left-right direction were used as the filling members. In Example 13, pieces of double-sided adhesive tape without a base material (9627 manufactured by 3M Japan Limited) having a length of 9 mm in the left-right direction were used as the filling members. It should be noted that the configurations of the IC tags according to Examples 11 and 13 were otherwise the same as that of Example 5.

Example 14

Figure 24A:
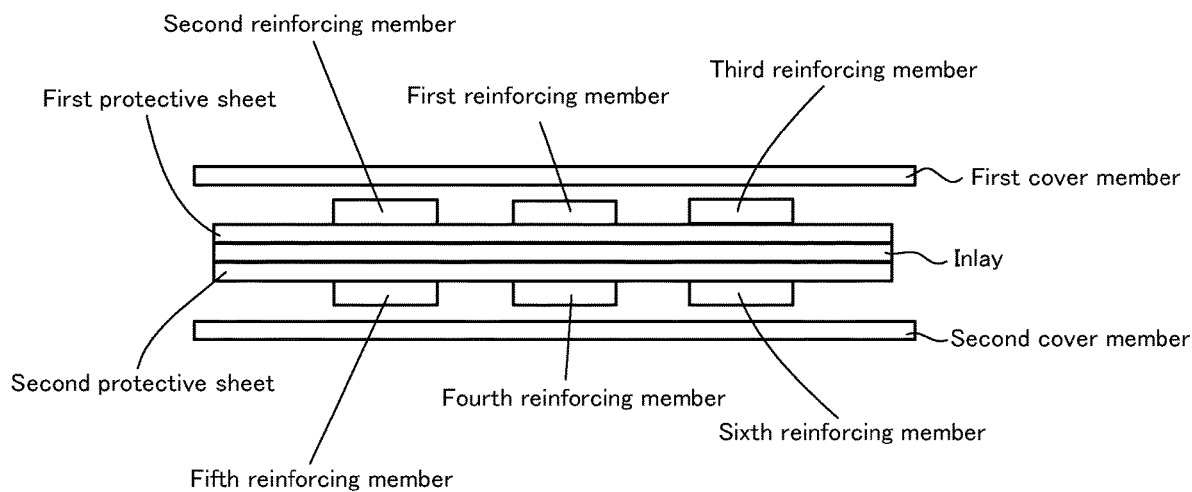
FIG. 24A is a cross-sectional view for explaining a method for producing an IC tag according to an example of the present invention.
Figure 24B:
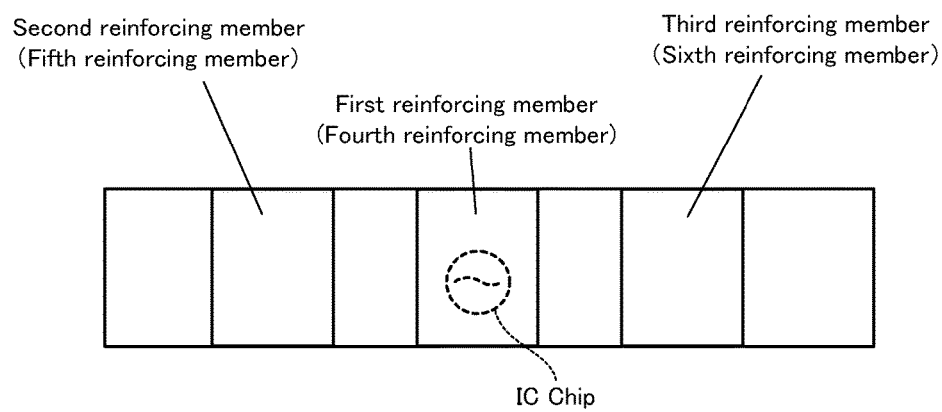
FIG. 24B is a plan view for explaining the relationship between the IC tag and reinforcing members according to the example of the present invention.

Next, as illustrated in FIGS. 24A and 24B, an IC tag according to Example 14 was produced by increasing the number of reinforcing members (Neo Fix 300 manufactured by Nichiei Kakoh Co., Ltd.) arranged on each of the upper and lower faces of the inlay of the IC tag according to Example 5 above to three.

Specifically, as illustrated in FIGS. 24A and 24B, in the IC tag according to Example 14, the first to third reinforcing members were arranged on the upper face side of the inlay, and the fourth to sixth reinforcing members were arranged on the lower face side of the inlay. On the upper face side, the first reinforcing member was disposed at the center of the inlay with respect to the left-right direction so as to cover the IC chip. In addition, the second and third reinforcing members were each disposed spaced apart from the first reinforcing member in the left-right direction by a distance of 4 mm. Similarly, on the lower face side, the fourth reinforcing member was disposed at the center of the inlay with respect to the left-right direction so as to cover the IC chip. In addition, the fifth and sixth reinforcing members were each disposed spaced apart from the fourth reinforcing member in the left-right direction by a distance of 4 mm. The width (length in the left-right direction) of each reinforcing member was 6 mm. It should be noted that a pressure-sensitive adhesive was applied only to faces of the first and fourth reinforcing members, and the cover members were respectively fixed thereto. That is to say, faces of the second and third reinforcing members and the fifth and sixth reinforcing members were not adhesively joined to the cover members. It should be noted that the configuration of the IC tag according to Example 14 was otherwise the same as that of Example 5.

Example 15

Figure 25:
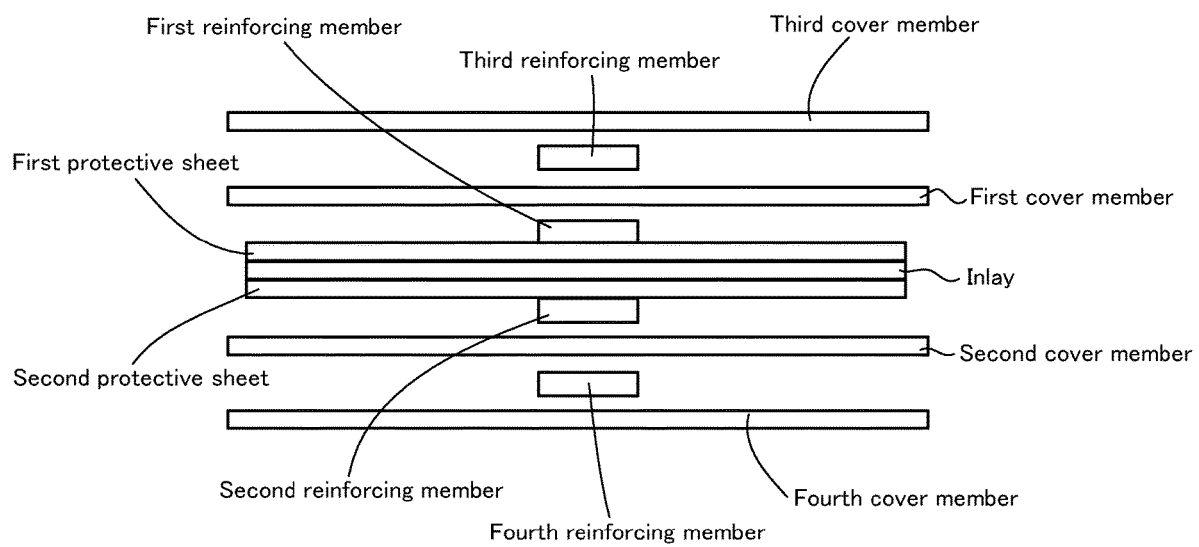
FIG. 25 is a cross-sectional view for explaining a method for producing an IC tag according to an example of the present invention.

Next, as illustrated in FIG. 25, an IC tag according to Example 15 was produced by alternatingly arranging two reinforcing members and two cover members on each of both faces of the inlay. Specifically, a first reinforcing member, a first cover member, a third reinforcing member, and a third cover member were stacked in this order on the upper face side of the inlay, and were adhesively joined to each other with a pressure-sensitive adhesive. Also, a second reinforcing member, a second cover member, a fourth reinforcing member, and a fourth cover member were stacked in this order on the lower face side of the inlay, and were adhesively joined to each other with a pressure-sensitive adhesive. All of the reinforcing members had the same dimensions, and all of the cover members also had the same dimensions. It should be noted that the cover members (Lumirror S10 manufactured by Toray Industries, Inc., thickness: 0.1 mm, without silicone coating) of Example 5 were used as the cover members, and the reinforcing members (Neo Fix 300 manufactured by Nichiei Kakoh Co., Ltd.) of Example 5 were used as the reinforcing members. Otherwise, the configuration of the IC tag according to Example 15 was the same as that of Example 5.

Evaluation Test

Five each of rubber products with respective IC tags, the IC tags being obtained in Examples 6 to 15, were prepared and subjected to repetitive flexing using a De Mattia flex tester (FT-1524 manufactured by Ueshima Seisakusho Co., Ltd.). After that, the readable ranges for 800 to 1000 Hz were measured using a Tagformance Lite (output power: 3.28 W EIRP), and it was confirmed whether or not the IC tags were readable and whether or not the readable ranges had decreased. The conditions for the flex test were as follows. It should be noted that "rear projection" means that the rubber product side of a rubber product with an IC tag was mountain-folded during flexing, whereas "front projection" means that the enclosing material side of the rubber product with the IC tag was mountain-folded during flexing.

Test temperature: 23±2° C.
Reciprocating motion: 300 cycles/minute
Distance between clamps: 78 mm at the maximum (stretched to the maximum), 18 mm at the minimum (flexed to the maximum)
Stroke: 60 mm
Number of flexes: rear projection: 1000 flexes→front projection: 1000 flexes→rear projection: 1000 flexes→front projection: 1000 flexes→rear projection: 10000 flexes, front projection: 10000 flexes
Table 2 below shows the results.

TABLE 2

| | Unreadable | Readable; Readable range had decreased | Readable; Readable range had not decreased |
|---|---|---|---|
| Example 6 | 2 | 1 | 2 |
| Example 7 | 1 | 1 | 3 |
| Example 8 | 2 | 2 | 1 |
| Example 9 | 0 | 1 | 4 |
| Example 10 | 1 | 2 | 2 |
| Example 11 | 1 | 1 | 3 |
| Example 12 | 3 | 1 | 1 |
| Example 13 | 0 | 1 | 4 |
| Example 14 | 0 | 0 | 5 |
| Example 15 | 0 | 0 | 5 |

As shown in Table 2, in the test, in which the total number of flexes was 12000, some of the IC tags of each of Examples 6 to 12 exhibited a deterioration in performance to such an extent that the readable range had decreased or the IC tag had become unreadable. However, with regard to the number of flexes, as described above, 12000 is such an extremely large number of flexes that is not usually expected in usage of a rubber product. Therefore, it can be said that even Examples 6 to 12, in each of which some of the IC tags exhibited a deterioration in performance as described above, had sufficient durability. In particular, in each of Examples 9 and 13, only one IC tag exhibited a deterioration in performance, and thus, it was found that Examples 9 and 13 had sufficiently high durability.

More specifically, Examples 9 to 13 were the examples in which the gap between each cover member and the corresponding reinforcing member was filled with the filling member. Among these examples, Examples 10 and 12, in which many samples exhibited a deterioration in performance, were the examples in which pieces of double-sided adhesive tape having the same dimensions as the cover members in plan view were used as the filling members. On the other hand, in the other examples (Examples 9, 11, and 13), the filling members were not adhesively joined to the respective cover members, or the filling members had a shorter length than the cover members and were thus not entirely adhesively joined to the respective cover members. Therefore, it was found that, in the case where a gap between a cover member and a reinforcing member was filled with a filling member, the durability of the IC tag can be improved by, instead of entirely fixing the filling member to the cover member, adopting a configuration in which the length of the filling member is shorter than the cover member, or the filling member is not fixed to the cover member.

Furthermore, in Examples 14 and 15, regardless of such an extremely large number of flexes that were performed in the test, none of the tested IC tags exhibited a deterioration in performance. Therefore, it was found that, with the configurations of Examples 14 and 15, an extremely highly durable IC tag can be provided.

REFERENCE SIGNS LIST

1: IC tag,
10: Inlay, 11: IC chip, 12: Antenna, 13: Base material,
14 and 15: Protective sheet,
21 and 22: Reinforcing member, 211 and 221: Outer peripheral edge (of reinforcing member),
31 and 32: Cover member,
U: Region (where adhesive joining is not performed), V and W: Region (where adhesive joining can be performed),
100: IC tag container,
4: Enclosing member, 41 and 42: Enclosing material, 411 and 421: Peripheral edge (of enclosing material),
5: Rubber product (Attachment target member), 51: Recess,
8: Rubber sheet,
1A: IC tag, 23: Filling member,
1B: IC tag, 31B and 32B: Cover member,
1C: IC tag, 31C and 32C: Covermember, Z: (Sealing) Region,
1D: IC tag,
61: First dielectric layer, 62: Antenna layer, 63: Second dielectric layer, 64: Shielding layer

The invention claimed is:

1. An IC tag attachable to an article, the IC tag comprising:
an inlay including an IC chip and an antenna electrically connected to the IC chip;
at least one reinforcing member that is disposed on at least one face of the inlay so as to protect the IC chip; and
at least one sheet-like cover member that is disposed on at least one face side of the inlay and that covers the reinforcing member,
wherein the reinforcing member is disposed closer to the IC chip than the cover member, and
wherein the cover member is not adhesively joined in a region around the reinforcing member and is adhesively joined to at least one of the inlay and the reinforcing member in another region so that an air layer is provided around side surfaces of the reinforcing member.

2. The IC tag according to claim 1,
wherein the reinforcing member is disposed so as to cover the IC chip, in order to protect the IC chip.

3. The IC tag according to claim 1, comprising:
the at least one reinforcing member comprises two reinforcing members and the at least one cover member comprises two cover members,
wherein respective both faces of the IC chip are covered with the respective reinforcing members, and
the respective reinforcing members are covered with the respective cover members.

4. The IC tag according to claim 3,
wherein each cover member is formed of a waterproof material and is larger than external shapes of the inlay and the reinforcing members in a plan view, and
both cover members are sealed together in a region surrounding the inlay and the reinforcing members so as to form an internal space that contains the inlay and the reinforcing members.

5. The IC tag according to claim 1, comprising:
the at least one reinforcing member comprises four reinforcing members and the at least one cover member comprises four cover members,
wherein two of the reinforcing members and two of the cover members are alternatingly arranged on each of both faces of the IC chip.

6. The IC tag according to claim 1,
wherein the cover member is formed of a pliable sheet-like resin material.

7. An IC tag container comprising:
the IC tag according to claim 1; and
an enclosing member that is disposed on at least one face side of the inlay and that covers the inlay, the reinforcing member, and the cover member.

8. The IC tag container according to claim 7,
wherein the enclosing member is formed into a bag-like shape that contains the inlay, the reinforcing member, and the cover member.

9. The IC tag container according to claim 8,
wherein the enclosing member is formed of a waterproof material.

10. The IC tag container according to claim 7,
wherein the enclosing member is formed of a fabric impregnated with rubber.

11. The IC tag container according to claim 10,
wherein the rubber is unvulcanized.

12. A rubber product with an IC tag, comprising:
the IC tag container according to claim 10; and
an attachment target member that is at least partially formed of a rubber material and that is adhesively joined to the enclosing member of the IC tag container.

13. The rubber product with an IC tag according to claim 12,
wherein the enclosing member of the IC tag container is formed into a sheet-like shape,
the inlay, the reinforcing member, and the cover member are disposed between the enclosing member and the attachment target member, and
a peripheral edge of the enclosing member is adhesively joined to the rubber material of the attachment target member.

14. An IC tag attachable to an article, the IC tag comprising:
an inlay including an IC chip and an antenna electrically connected to the IC chip;
at least one reinforcing member that is disposed on at least one face of the inlay so as to protect the IC chip; and
at least one sheet-like cover member that is disposed on at least one face side of the inlay and that covers the reinforcing member, wherein the reinforcing member is disposed closer to the IC chip than the cover member, wherein the cover member is adhesively joined to at least one of the inlay and the reinforcing member such that a gap is provided around side surfaces of the reinforcing member, and the gap provided around the side surfaces of the reinforcing member between the cover member and the inlay is filled with a filling member that is softer than the cover member.

15. The IC tag according to claim 14, wherein the filling member is foam or a pressure-sensitive adhesive.

* * * * *